United States Patent
Baek et al.

(10) Patent No.: US 10,282,805 B2
(45) Date of Patent: May 7, 2019

(54) IMAGE SIGNAL PROCESSOR AND DEVICES INCLUDING THE SAME

(71) Applicants: Byung Joon Baek, Goyang-si (KR); Kyeong Jong Lim, Seoul (KR)

(72) Inventors: Byung Joon Baek, Goyang-si (KR); Kyeong Jong Lim, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 14/991,103

(22) Filed: Jan. 8, 2016

(65) Prior Publication Data

US 2016/0227160 A1    Aug. 4, 2016

(30) Foreign Application Priority Data

Feb. 23, 2015 (KR) .................. 10-2015-0025390

(51) Int. Cl.
*H04N 9/74* (2006.01)
*G06T 1/20* (2006.01)
*G06F 13/42* (2006.01)

(52) U.S. Cl.
CPC ............ *G06T 1/20* (2013.01); *G06F 13/4265* (2013.01); *Y02D 10/14* (2018.01); *Y02D 10/151* (2018.01)

(58) Field of Classification Search
CPC .... H04N 7/08; H04N 9/74; G06T 1/20; G06F 13/4265
USPC ......................................... 348/584, 705, 706
See application file for complete search history.

(56) References Cited

U.S. PATENT DOCUMENTS

| | | | |
|---|---|---|---|
| 6,493,878 B1 * | 12/2002 | Kassatly | .................. H04N 7/08 348/E7.024 |
| 6,597,810 B1 | 7/2003 | Morishige | |
| 6,647,150 B2 | 11/2003 | van der Wal | |
| 7,064,778 B1 * | 6/2006 | Waehner | ............ H04N 5/23203 348/211.11 |
| 8,154,610 B2 | 4/2012 | Jo et al. | |
| 8,368,778 B2 | 2/2013 | Lee | |
| 8,483,269 B2 * | 7/2013 | Kim | ...................... H04H 20/95 375/240.01 |
| 8,493,482 B2 | 7/2013 | Cote et al. | |
| 8,755,410 B2 | 6/2014 | Todo et al. | |
| 8,810,563 B2 * | 8/2014 | Takizuka | ............. H04N 13/139 345/418 |
| 8,817,139 B2 | 8/2014 | Yanada et al. | |
| 2008/0151115 A1 | 6/2008 | Agung et al. | |
| 2011/0019936 A1 | 1/2011 | Bhrugumalla | |

FOREIGN PATENT DOCUMENTS

JP          06-076051       3/1994
JP          2000259812 A    9/2000

* cited by examiner

*Primary Examiner* — Trang U Tran
(74) *Attorney, Agent, or Firm* — Harness, Dickey & Pierce, P.L.C.

(57) ABSTRACT

An image signal processor including a first data processing circuit, a second data processing circuit, and a multiplexing control circuit configured to transmit first line data included in first frame data and second line data included in second frame data to the first data processing circuit in a time-division multiplexing mode may be provided. The multiplexing control circuit may be further configured to transmit to the first data processing circuit a switching control signal, which indicates whether current line data to be transmitted to the first data processing circuit is the first line data or the second line data.

16 Claims, 15 Drawing Sheets

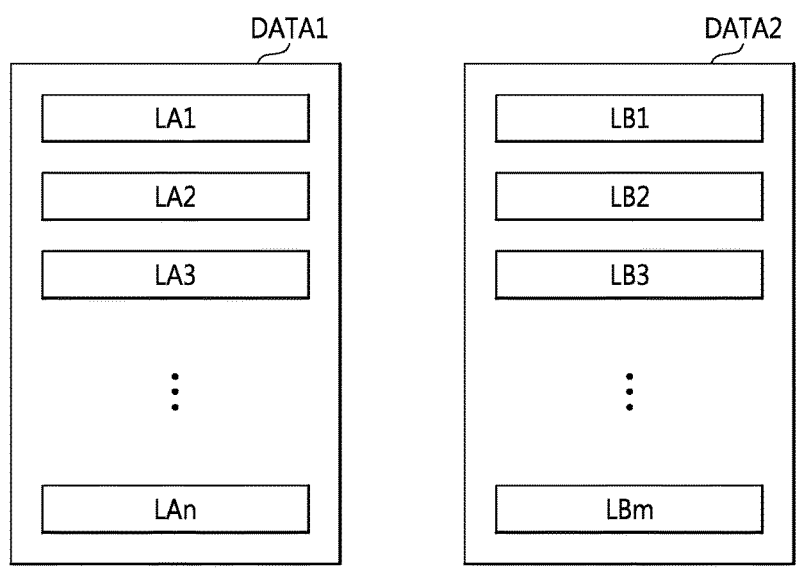

US 10,282,805 B2

IMAGE SIGNAL PROCESSOR AND DEVICES INCLUDING THE SAME

CROSS-REFERENCE TO RELATED APPLICATION

This application claims priority under 35 U.S.C. § 119(a) from Korean Patent Application No. 10-2015-0025390 filed on Feb. 23, 2015, the disclosure of which is hereby incorporated by reference in its entirety.

BACKGROUND

Example embodiments relate to image signal processors, and more particularly, to image signal processors for performing time-division multiplexing on an image in units of line data and/or devices including the same.

According to a conventional technology, a single image signal processor can processes multiple input images by performing time-division multiplexing, which uses external frame memory. When an image signal processor performs image signal processing on input images using external frame memory in a time-division multiplexing mode, the image signal processor may perform multiplexing in units of frame data. Thus, the image signal processor stores input images in the external frame memory in units of frame data. At this time, each of the frame data units in the input images are mitten to and read from the external frame memory through a bus, which leads to an increase of power consumption of a system including the image signal processor due to bus transaction.

SUMMARY

According to an example embodiment of the inventive concepts, an image signal processor includes a first data processing circuit, a second data processing circuit, and a multiplexing control circuit configured to transmit first line data included in first frame data and second line data included in second frame data to the first data processing circuit in a time-division multiplexing mode. The multiplexing control circuit may be further configured to transmit a switching control signal to the first data processing circuit, the switching control signal indicating whether current line data to be transmitted to the first data processing circuit is the first line data or the second line data.

The first frame data may be data captured by a first imaging device having a first resolution and the second frame data may be data captured by a second imaging device having a second resolution.

The image signal processor may further include a first buffer and a second buffer. At this time, the first data processing circuit may include a memory controller configured to store the first line data and the second line data in the first buffer and the second buffer, respectively.

The first data processing circuit may configure elements to process the first line data when the switching control signal indicates that the current line data is the first line data and may configure the elements to process the second line data when the switching control signal indicates that the current line data is the second line data.

The first data processing circuit may be a first image signal processor core and the second data processing circuit may be a second image signal processor core. The first data processing circuit may be a first scaler and the second data processing circuit may be a second scaler.

The multiplexing control circuit may be configured to first transmit one of the first line data and the second line data to the first data processing circuit based on a phase of a first sync signal related to the first frame data and a phase of the second sync signal related to the second frame data. The multiplexing control circuit may include a line memory configured to store the other one of the first line data and the second line data.

The multiplexing control circuit may be configured to transmit the first line data and the second line data in a single stream to the first data processing circuit.

According to an example embodiment of the inventive concepts, an application processor includes a bus, an image signal processor connected to the bus, and a central processing unit (CPU) connected to the bus and configured to control the image signal processor. The image signal processor may include a first data processing circuit, a second data processing circuit, and a multiplexing control circuit configured to transmit first line data included in first frame data and second line data included in second frame data to the first data processing circuit in a time-division multiplexing mode. The first frame data and the second frame data may have a first resolution and a second resolution, respectively. The multiplexing control circuit may be further configured to transmit a switching control signal to the first data processing circuit, the switching control signal being a signal indicating whether current line data to be transmitted to the first data processing circuit is the first line data or the second line data.

According to an example embodiment of the inventive concepts, a mobile computing device includes a first imaging device having a first resolution, a second imaging device having a second resolution, and an application processor connected to the first imaging device and the second imaging device. The application processor may include a bus, an image signal processor connected to the bus, and a CPU connected to the bus and configured to control the image signal processor. The image signal processor may include a first data processing circuit, a second data processing circuit, and a multiplexing control circuit configured to transmit first line data and second line data to the first data processing circuit in a time-division multiplexing mode. The first line data may be included in first frame data output from the first imaging device and the second line data may be included in second frame data output from the second imaging device. The multiplexing control circuit may be further configured to transmit to the first data processing circuit a switching control signal, which indicates whether current line data to be transmitted to the first data processing circuit is the first line data or the second line data.

The first data processing circuit may configure elements to process the first line data when the switching control signal indicates that the current line data is the first line data and may configure the elements to process the second line data when the switching control signal indicates that the current line data is the second line data.

The multiplexing control circuit may be configured to transmit one of the first line data and the second line data first to the first data processing circuit based on a phase of a first sync signal related to the first frame data and a phase of the second sync signal related to the second frame data and the multiplexing control circuit may include a line memory configured to store the other one of the first line data and the second line data.

According to an example embodiment of the inventive concepts, an image signal processor includes a first data processing circuit, a second data processing circuit, and a multiplexing control circuit including a switching determination circuit, a first line memory, and a first selection circuit. The switching determination circuit may be configured to generate a first selection signal. The first selection circuit may be configured to transmit one line data selected from among the first line data and the second line data at a first time through a transmission line and transmit the non-selected one of the first line data and the second line data stored in the first line memory at a second time based on the first selection signal and the second time may be later than the first time.

BRIEF DESCRIPTION OF THE DRAWINGS

The above and other features and advantages of the inventive concepts will become more apparent by describing in detail some example embodiments thereof with reference to the attached drawings in which:

FIG. 4 is a diagram of images output from imaging devices according to an example embodiment of the inventive concepts;

FIG. 5 is a diagram of operating modes of the imaging devices according to an example embodiment of the inventive concepts;

DETAILED DESCRIPTION

Figure 1:
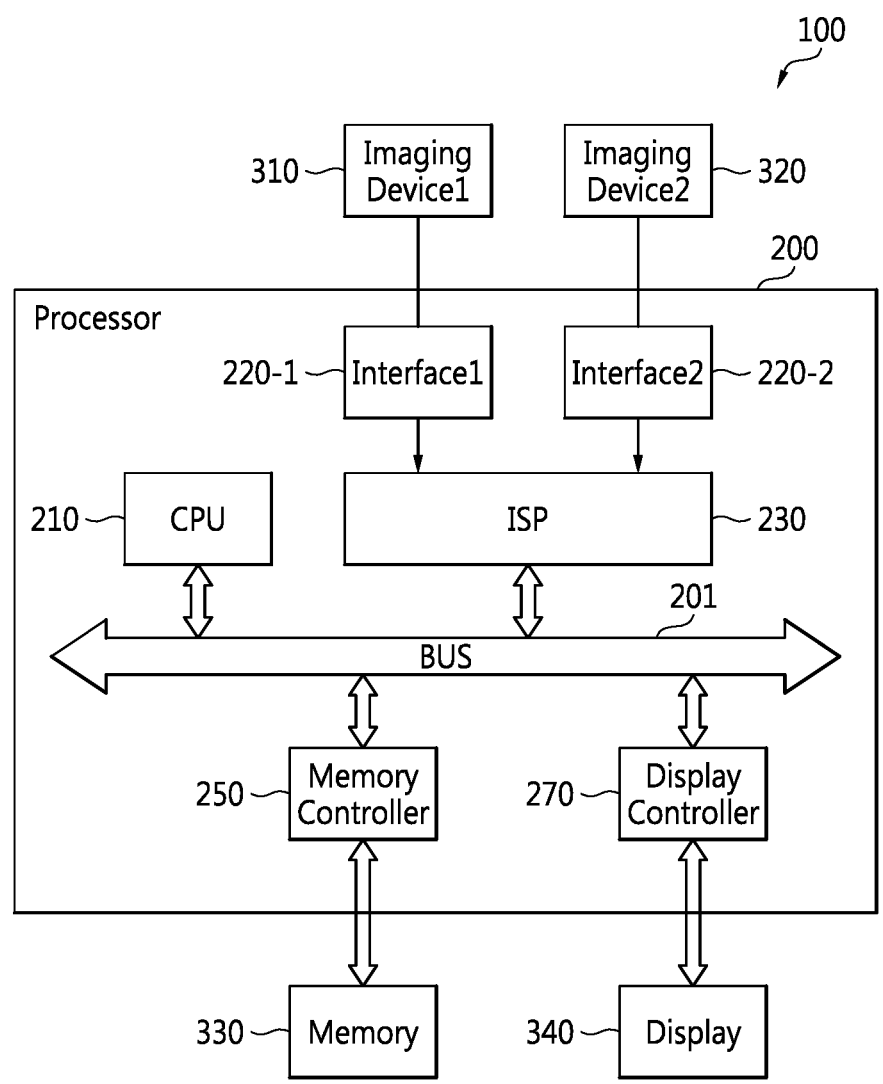
FIG. 1 is a block diagram of a data processing system according to an example embodiment of the inventive concepts.

Various example embodiments of the inventive concepts now will be described more fully hereinafter with reference to the accompanying drawings, in which example embodiments of the inventive concepts are shown. The inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "\".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the inventive concepts. As used herein, the singular forms "a", "an" and the are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly no defined herein.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Example embodiments of inventive concepts can be embodied as hardware, software, or combinations of hardware and software. Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

Some example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Hereinafter, some example embodiments will be explained in further detail with reference to the accompanying drawings.

FIG. 1 is a block diagram of a data processing system 100 according to an example embodiment of the inventive concepts. The data processing system 100 may include a processor 200, a plurality of imaging devices 310 and 320, an external memory 330, and a display 340. The data processing system 100 may be implemented as, for example, a personal computer (PC) or a mobile computing device. The mobile computing device may be, for example, a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The processor 200 may be implemented as an integrated circuit (IC), a motherboard, a system on chip (SoC), an application processor (AP), or a mobile AP. The processor 200 may include bus architecture (or a bus) 201, a central processing unit (CPU) 210, a plurality of interfaces 220-1 and 220-2, an image signal processor (ISP) 230, a memory controller 250, and a display controller 270. The CPU 210, the ISP 230, the memory controller 250, and the display controller 270 may communicate a command and/or data with one another through the bus architecture 201. The bus architecture 201 may be implemented as, for example, a bus using an advanced microcontroller bus architecture (AMBA) protocol, a bus using an advanced high-performance bus (AHB) protocol, a bus using an advanced peripheral bus (APB) protocol, a bus using an AMBA extensible interconnect (AXI) protocol, or a combination thereof.

The CPU 210 may control the overall operation of the processor 200. For example, the CPU 210 may control the interfaces 220-1 and 220-2, the ISP 230, the memory controller 250, and the display controller 270. The CPU 210 may include at least one core.

The first interface 220-1 may receive, for example, a first image and first control signals from the first imaging device 310 and transmit them to the ISP 230. The second interface 220-2 may receive, for example, a second image and second control signals from the second imaging device 320 and transmit them to the ISP 230. The first image may refer to, for example, first picture, first image data, first data stream, or first frame data. The second image may refer to, for example, second picture, second image data, second data stream, or second frame data.

The first imaging device 310 may be implemented as, for example, a complementary metal oxide semiconductor (CMOS) image sensor chip or a camera module. The first imaging device 310 may transmit the first image and the first control signals to the first interface 220-1 using, for example, mobile industry processor interface (MIPI) camera serial interface (CSI). The second imaging device 320 may also be implemented as a CMOS image sensor chip or a camera module. The second imaging device 320 may transmit the second image and the second control signals to the second interface 220-2 using, for example, MIPI CSI. The resolution of the first image may be different from that of the second image.

The ISP 230 may perform time-division multiplexing (TDM) on the first image and/or the second image. The TDM may not be performed in units of frame data. Instead, the TDM may be performed in units of line data without using the external memory 330. The ISP 230 may include a plurality of cores to process images, which is output from the imaging devices 310 and 320, in units of line data in TDM mode simultaneously, in parallel, or on the fly. Accordingly, the ISP 230 may be implemented as a multi-core ISP.

Each of ISP cores may perform at least one among auto dark level compensation, bad pixel replacement, noise reduction, lens shading compensation, color correction, RGB gamma correction, edge enhancement, hue control, and color suppression. Each of blocks 500-1, 500-3, and 500-4, which will be described with reference to FIG. 10 later, may perform, for example, at least one of the foregoing operations.

Figure 11:
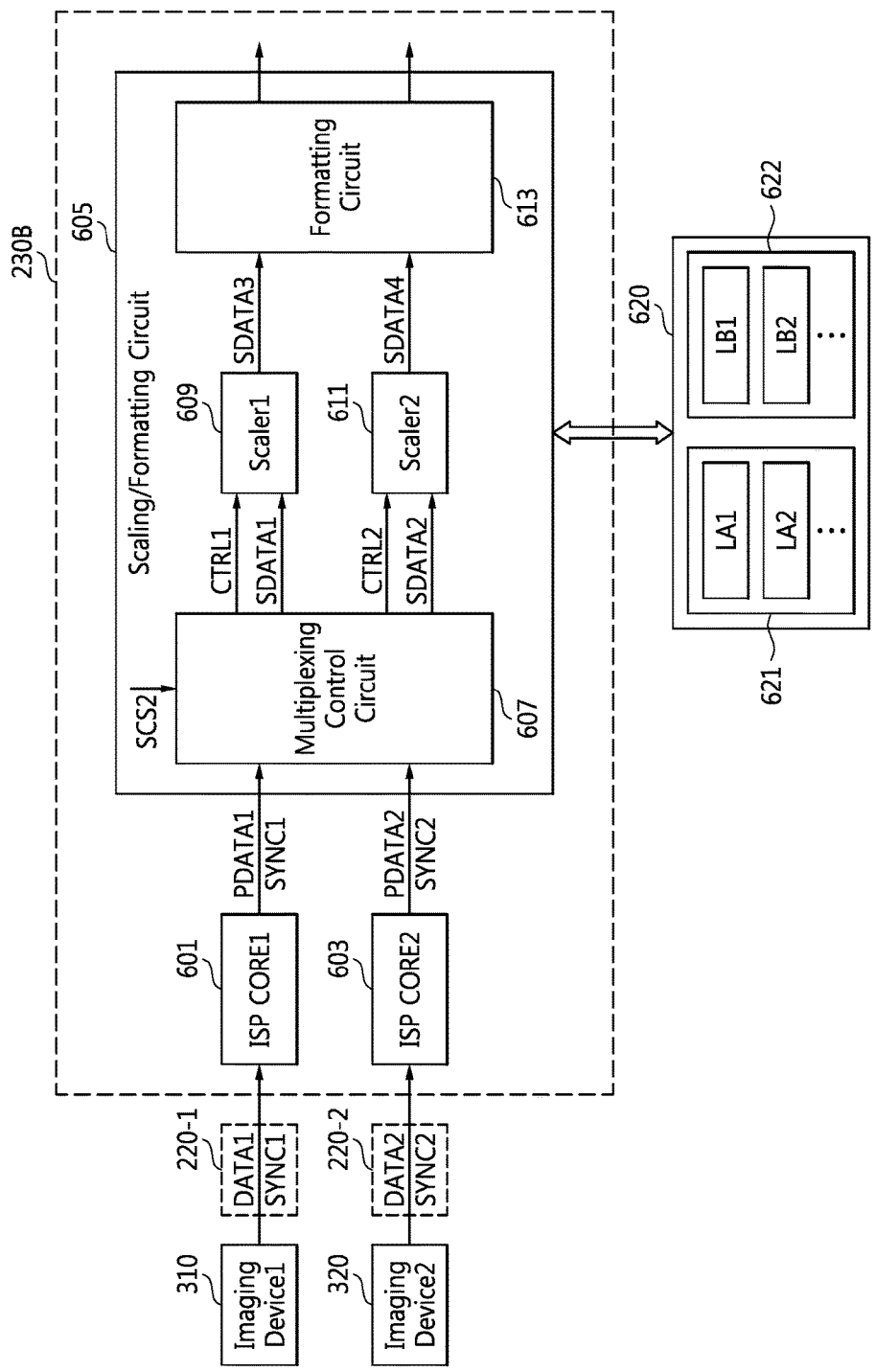
FIG. 11 is a block diagram showing still another example of the ISP illustrated in FIG. 1.

For instance, in order to process images output from the imaging devices 310 and 320 in units of line data in TDM mode simultaneously, in parallel, or on the fly, an ISP 230B shown in FIG. 11 may include a plurality of ISP cores 601 and 603 and a plurality of scalers 609 and 611.

The memory controller 250 may store line data, which have been processed by the ISP 230 in TDM mode, in the external memory 330 according to the control of the CPU 210. The display controller 270 may transmit data (e.g., frame data) from the external memory 330 to the display 340 according to the control of the CPU 210. For example, the display controller 270 may transmit data (e.g., frame data) from the external memory 330 to the display 340 using, for example, MIPI display serial interface (DSI) or embedded DisplayPort (eDP).

Figure 2:
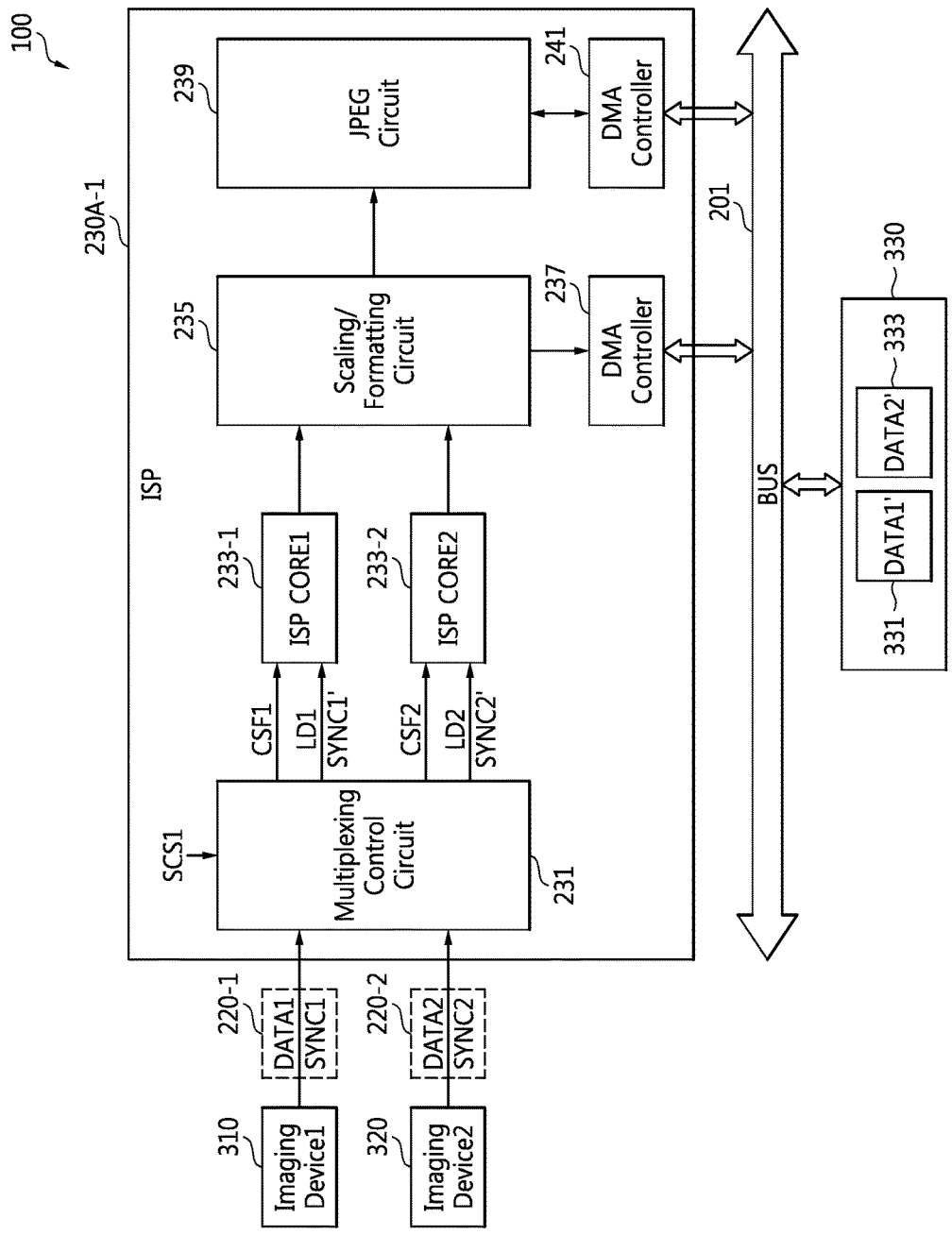
FIG. 2 is a block diagram showing an example of an image signal processor (ISP) illustrated in FIG. 1.

FIG. 2 is a block diagram showing an example of the ISP 230 illustrated in FIG. 1. Although there are two imaging devices 310 and 320 and two ISP cores 233-1 and 233-2 in the example embodiment illustrated in FIG. 2, the inventive concepts are not restricted to the numbers of imaging devices and ISP cores. When the data processing system 100 includes a dual camera (including the imaging devices 310 and 320), the first imaging device 310 may be a rear camera and the second imaging device 320 may be a front camera.

An ISP 230A-1 may include a multiplexing control circuit 231, the ISP cores 233-1 and 233-2, a scaling/formatting circuit 235, a first direct memory access (DMA) controller 237, a multimedia processing circuit 239, and a second DMA controller 241. The multimedia processing circuit 239 may be implemented as, for example, a Joint Photographic Experts Group (JPEG) circuit or a Moving Picture Experts Group (MPEG) circuit.

The first interface 220-1 may transmit a first image DATA1 and first control signals SYNC1 from the first imaging device 310 to the multiplexing control circuit 231. The second interface 220-2 may transmit a second image DATA2 and second control signals SYNC2 from the second imaging device 320 to the multiplexing control circuit 231.

FIG. 4 is a diagram of images output from imaging devices according to an example embodiment of the inventive concepts. Referring to FIG. 4, the first image DATA1 may include a plurality of line data LA1 through LAn. The second image DATA2 may include a plurality of line data LB1 through LBm. Here, "n" and "m" are natural numbers of at least 4. When the resolution of the first image DATA1 is higher than that of the second image DATA2, "n" may be greater than "m".

The first control signals SYNC1 are involved with processing of the first image DATA1 and may include a first vertical sync signal, a first horizontal sync signal, a first clock signal, and a first data enable signal. The second control signals SYNC2 are involved with processing of the second image DATA2 and may include a second vertical sync signal, a second horizontal sync signal, a second clock signal, and a second data enable signal. Hereinafter, the first control signals SYNC1 may be referred to as a first sync signal SYNC1 and the second control signals SYNC2 may be referred to as a second sync signal SYNC2.

The multiplexing control circuit 231 may transmit each of the line data LA1 through LAn included in the first image DATA1 to either the first ISP core 233-1 or the second ISP core 233-2 based on a first mode control signal SCS1, the first sync signal SYNC1, and the second sync signal SYNC2. The multiplexing control circuit 231 may also transmit each of the line data LB1 through LBm included in the second image DATA2 to either the first ISP core 233-1 or the second ISP core 233-2 based on the first mode control signal SCS1, the first sync signal SYNC1, and the second sync signal SYNC2.

The multiplexing control circuit 231 may output first output data LD1 to the first ISP core 233-1 according to the first mode control signal SCS1. The first output data LD1 may include, for example, the line data LA1 through LAn of the first image DATA1, the line data LB1 through LBm of the second image DATA2, or at least one line data among the line data LA1 through LAn of the first image DATA1 and at least one line data among the line data LB1 through LBm of the second image DATA2, according to an operating mode of each of the imaging devices 310 and 320.

When the first ISP core 233-1 processes a captured image, the first imaging device 310 may perform a first operation (e.g., an image capturing operation), and the second imaging device 320 may perform a second operation (e.g., a pre-view operation) according to the operating modes of the imaging devices 310 and 320. Then, the multiplexing control circuit 231 may transmit the first output data LD1, which is the first image DATA1 output from the first imaging device 310, to the first ISP core 233-1 as and may transmit a second output data LD2, which is the second image DATA2 output from the second imaging device 320, to the second ISP core 233-2. The second operation may be an operation such as a recording operation or a pre-view operation other than the image capturing operation. At this time, the multiplexing control circuit 231 may transmit a third sync signal SYNC1' together with the first output data LD1 (=DATA1) to the first ISP core 233-1 and may also transmit to the first ISP core 233-1 a first switching control signal CSF1, which indicates that each line data in the first output data LD1 (=DATA1) is involved in the first image DATA1. The third sync signal SYNC1' may be generated based on the first sync signal SYNC1. Further, the multiplexing control circuit 231 may transmit a fourth sync signal SYNC2' together with the second output data LD2 (=DATA2) to the second ISP core 233-2 and may also transmit to the second ISP core 233-2 a second switching control signal CSF2, which indicates that each line data in the second output data LD2 (=DATA2) is involved in the second image DATA2. The fourth sync signal SYNC2' may be generated based on the second sync signal SYNC2.

The first ISP core 233-1 may configure elements or components (e.g., 500-1 through 500-4 in FIG. 10) to process each line data included in the first output data LD1 (=DATA1) according to the first switching control signal CSF1. The second ISP core 233-2 may configure its elements or components (or hardware components) to process each line data included in the second output data LD2 (=DATA2) according to the second switching control signal CSF2.

When the first ISP core 233-1 processes a captured image, the first imaging device 310 may perform the second operation (e.g., the pre-view operation), and the second imaging device 320 may perform the first operation (e.g., the image capturing operation) according to the operating modes of the imaging devices 310 and 320. Then, the multiplexing control circuit 231 may transmit the second image DATA2 output from the second imaging device 320 to the first ISP core 233-1 as the first output data LD1 and may transmit the first image DATA1 output from the first imaging device 310 to the second ISP core 233-2 as the second output data LD2. At this time, the multiplexing control circuit 231 may transmit the third sync signal SYNC1' together with the first output data LD1 (=DATA2) to the first ISP core 233-1 and may also transmit the first switching control signal CSF1, which indicates that each line data in the first output data LD1 (=DATA2) is involved in the second image DATA2, to the first ISP core 233-1. The third sync signal SYNC1' may be generated based on the second sync signal SYNC2. Further, the multiplexing control circuit 231 may transmit the fourth sync signal SYNC2' together with the second output data LD2 (=DATA1) to the second ISP core 233-2 and may also transmit the second switching control signal CSF2, which indicates that each line data in the second output data LD2 (=DATA1) is involved in the first image DATA1, to the second ISP core 233-2. The fourth sync signal SYNC2' may be generated based on the first sync signal SYNC1.

The first ISP core 233-1 may configure its elements (or components) to process each line data included in the first output data LD1 (=DATA2) according to the first switching control signal CSF1. The second ISP core 233-2 may configure its elements to process each line data included in the second output data LD2 (=DATA1) according to the second switching control signal CSF2.

When the first ISP core 233-1 processes a captured image, both the first imaging device 310 and the second imaging device 320 may perform the first operation (e.g., the image capturing operation), according to the operating modes of the imaging devices 310 and 320. Then, the multiplexing control circuit 231 may transmit the first image DATA1 output from the first imaging device 310 to the first ISP core 233-1 as the first output data LD1 and may transmit the second image DATA2 output from the second imaging device 320 to the first ISP core 233-1 as the first output data LD1. For instance, as shown in FIG. 7 or 8 or FIGS. 13A through 13C, the multiplexing control circuit 231 may interleave line data using time division.

At this time, the multiplexing control circuit 231 may transmit the third sync signal SYNC1' together with the first output data LD1 to the first ISP core 233-1 and may also transmit the first switching control signal CSF1, which indicates that each line data in the first output data LD1 is involved in the first or second image DATA1 or DATA2, to the first ISP core 233-1. The third sync signal SYNC1' may be generated based on the first sync signal SYNC1 and the second sync signal SYNC2.

The first output data LD1 may include at least one line data among the line data LA1 through LAn of the first image DATA1 and at least one line data among the line data LB1 through LBm of the second image DATA2. In other words, the multiplexing control circuit 231 may transmit time-divided line data to the first ISP core 233-1 using a data interleaving method. The first ISP core 233-1 may change the configuration of its elements according to the first switching control signal CSF1 indicating whether each line data in the first output data LD1 is included in the first image DATA1 or the second image DATA2.

The scaling/formatting circuit 235 may perform a scale operation on data output from the first ISP core 233-1 and/or the second ISP core 233-2 and may change the format of the scaled data to generate the data in a changed format. At this time, the scale operation may include a scale-up operation or a scale-down operation.

The first DMA controller 237 may store processed images DATA1' and DATA2' output from the scaling/formatting circuit 235 in the external memory 330 through the bus architecture 201. The first processed image DATA1' may be stored in a first memory area 331 of the external memory 330 and the second processed image DATA2' may be stored in a second memory area 333 of the external memory 330. The external memory 330 may include, for example, random access memory (RAM) or a dynamic RAM (DRAM).

The scaling/formatting circuit 235 may transmit processed data to the multimedia processing circuit 239. The multimedia processing circuit 239 may read or fetch the first processed image DATA1' from the external memory 330 using the second DMA controller 241, may process the first processed image DATA1', and may write a processed image to the external memory 330 using the second DMA controller 241. Further, the multimedia processing circuit 239 may read or fetch the second processed image DATA2' from the external memory 330 using the second DMA controller 241, may process the second processed image DATA2', and may write a processed image to the external memory 330 using the second DMA controller 241.

Figure 3:
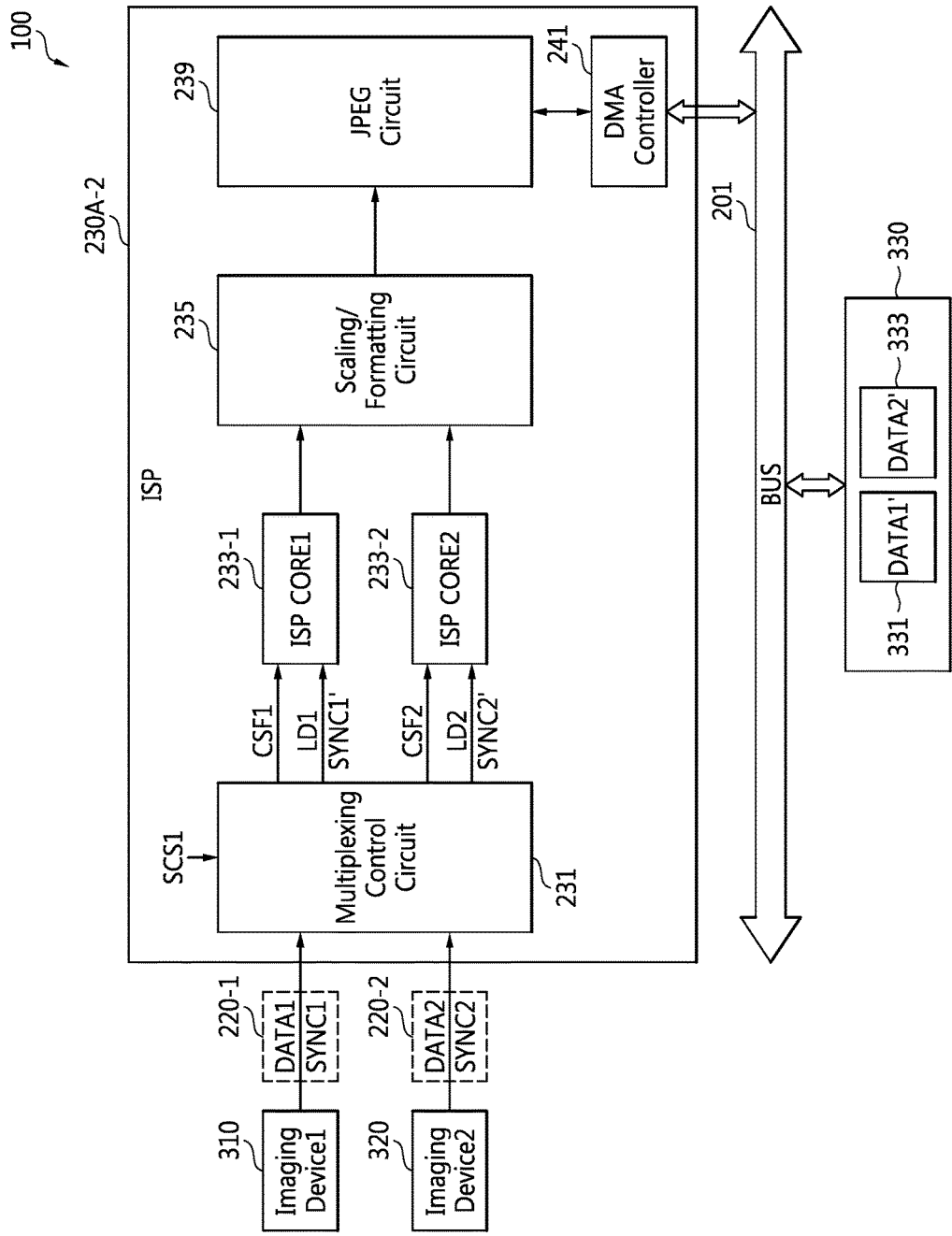
FIG. 3 is a block diagram showing another example of the ISP illustrated in FIG. 1.

FIG. 3 is a block diagram showing another example of the ISP 230 illustrated in FIG. 1. Referring to FIGS. 2 and 3, an ISP 230A-2 does not include the first DMA controller 237. The structure and operations of the ISP 230A-2 illustrated in FIG. 3 are substantially the same as or similar to those of the ISP 230A-1 illustrated in FIG. 2. Thus, detailed descriptions of the structure and operations of the ISP 230A-2 will be omitted.

In the example embodiment illustrated in FIG. 3, the scaling/formatting circuit 235 may transmit processed data to the multimedia processing circuit 239. The multimedia processing circuit 239 may process the data output from the scaling/formatting circuit 235 and store the processed images DATA1' and DATA2' in the external memory 330 through the bus architecture 201 using the second DMA controller 241. The first processed image DATA1' may be stored in the first memory area 331 of the external memory 330 and the second processed image DATA2' may be stored in the second memory area 333 of the external memory 330.

The multimedia processing circuit 239 illustrated in FIG. 3 may support line data interleaving. As shown in FIGS. 2 and 3, the ISP 230A-1 or 230A-2 does not access an external frame memory until an image is processed by the ISP cores 233-1 and 233-3.

FIG. 5 is a diagram of operating modes of the imaging devices 310 and 320 according to an example embodiment of the inventive concepts. Referring to FIGS. 2 and 5, both of the imaging devices 310 and 320 operate in a capture mode in a first case CASE1. The first imaging device 310 operates in the capture mode and the second imaging device 320 operates in a pre-view mode in a second case CASE2. The imaging devices 310 and 320 may perform an image capturing operation or a first operation in the capture mode.

A first mode control signal SCS1 may be related to information (or data) about the operating mode of each of the imaging devices 310 and 320. The first mode control signal SCS1 may be programmed to or stored in, for example, a register, e.g., a special function register (SFR). The CPU 210 may program or set the first mode control signal SCS1 in the register. The first mode control signal SCS1 may be a digital signal or a digital code.

In the first case CASE1, the multiplexing control circuit 231 may process line data using line data interleaving. In the second case CASE2, the first image DATA1 is processed by the first ISP core 233-1 and the second image DATA2 is processed by the second ISP core 233-2. In a third case CASE3 where the first imaging device 310 operates in the pre-view mode and the second imaging device 320 operates in the capture mode, the first image DATA1 is processed by the second ISP core 233-2 and the second image DATA2 is processed by the first ISP core 233-1.

Figure 6:
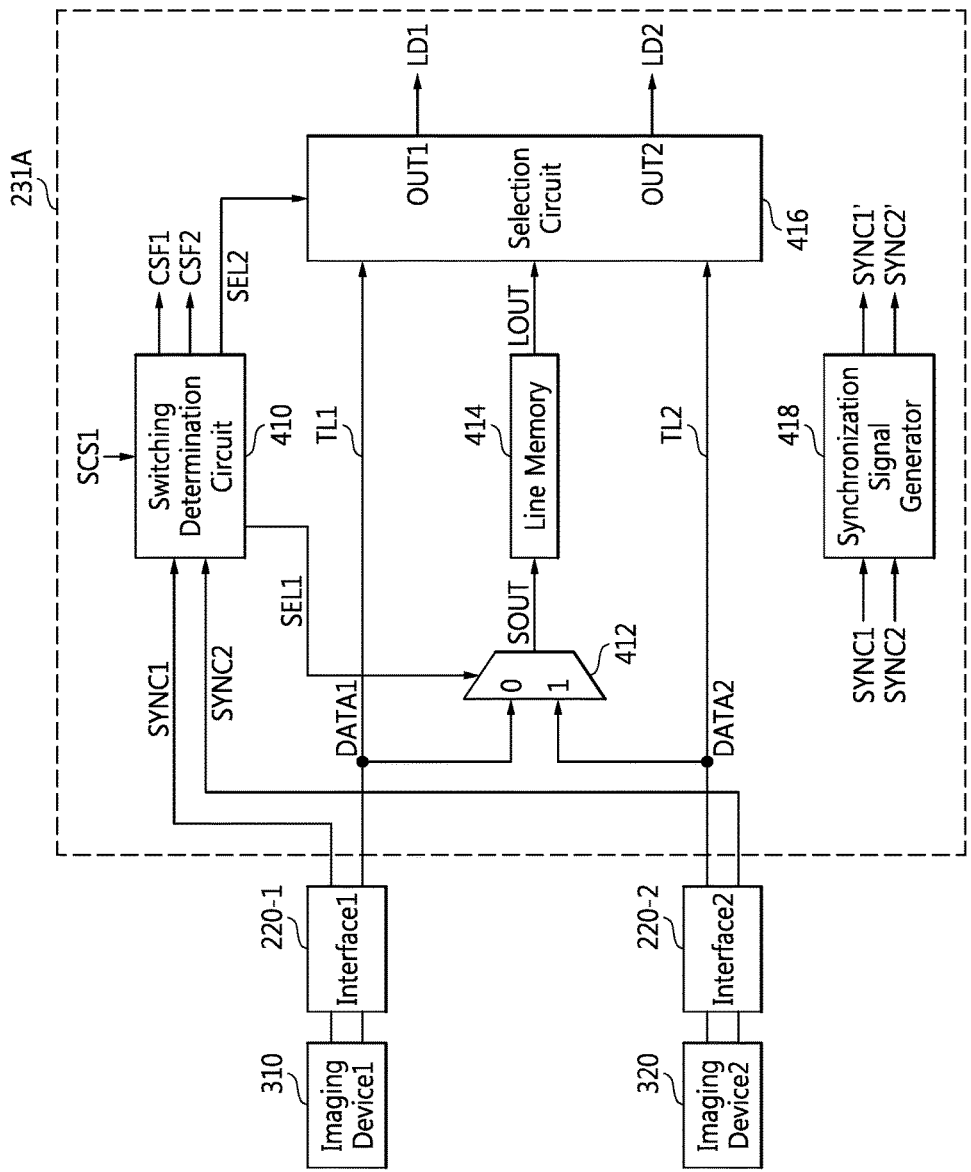
FIG. 6 is a block diagram showing an example of a multiplexing control circuit illustrated in FIG. 2 or 3.
Figure 7:
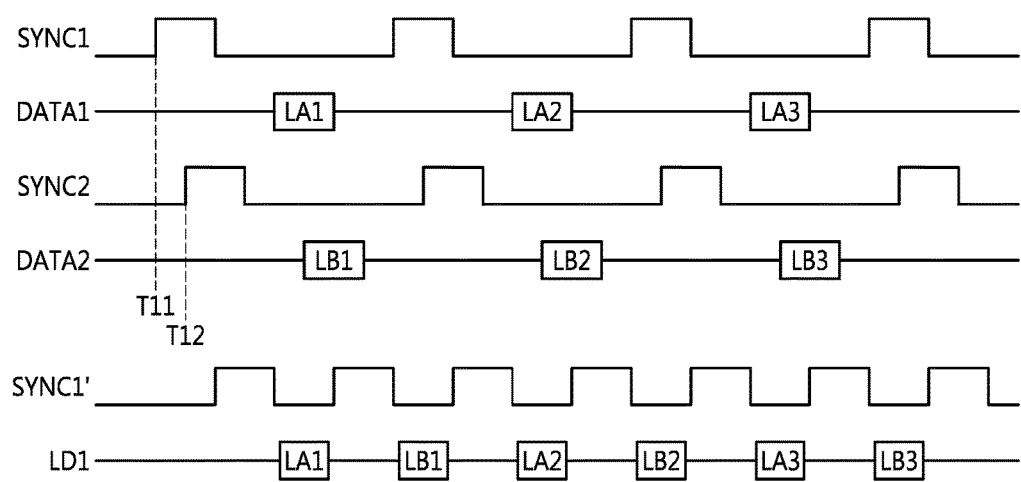
FIG. 7 is a timing chart showing time-division multiplexing of line data performed by the multiplexing control circuit illustrated in FIG. 6 according to an example embodiment of the inventive concept.

FIG. 6 is a block diagram showing an example of the multiplexing control circuit 231 illustrated in FIG. 2 or 3, FIG. 7 is a timing chart showing time-division multiplexing of line data performed by the multiplexing control circuit 231A illustrated in FIG. 6 according to an example embodiment of the inventive concepts.

It is assumed that both the imaging devices 310 and 320 operate in the capture mode and the first ISP core 233-1 exclusively processes the images DATA1 and DATA2 captured by the respective imaging devices 310 and 320. At this time, the first mode control signal SCS1 may be a signal indicating that both of the imaging devices 310 and 320 operate in the capture mode. In other words, the first mode control signal SCS1 may indicate that the images DATA1 and DATA2 will be processed by the first ISP core 233-1.

Referring to FIG. 6, a multiplexing control circuit 231A may include a switching determination circuit 410, a first selection circuit 412, a line memory 414, a second selection circuit 416, and a synchronization signal generator 418. The line memory 414 may be implemented as first-in first-out (FIFO) memory. The line memory 414 may be a 1-line data memory.

The switching determination circuit 410 may generate a first selection signal SEL1 and a second selection signal SEL2 based on the first mode control signal SCS1, the first sync signal SYNC1, and the second sync signal SYNC2 and may also generate the first and second switching control signals CSF1 and CSF2. The first selection signal SEL1 may be a signal for controlling the selection operation of the first selection circuit 412. When the first selection signal SEL1 is at a first level (e.g., a low level or logic 0), the first selection circuit 412 may transmit line data included in the first image DATA1 to the line memory 414. When the first selection signal SEL1 is at a second level (e.g., a high level or logic 1), the first selection circuit 412 may transmit line data included in the second image DATA2 to the line memory 414. In other words, the first selection circuit 412 may output as output line data SOUT line data included in the first image DATA1 or line data included in the second image DATA2 to the line memory 414.

The second selection signal SEL2 may be a signal for controlling the selection operation of the second selection circuit 416. The second selection circuit 416 may output line data received through a first transmission line TL1, line data LOUT output from the line memory 414, or line data received through a second transmission line TL2 through a first output terminal OUT or a second output terminal OUT2 in response to the second selection signal SEL2. The second selection circuit 416 may output the line data received through the first transmission line TL1 through the first output terminal OUT1 and the line data received through the second transmission line TL2 through the second output terminal OUT2 in response to the second selection signal SEL2. The second selection circuit 416 may also output the line data received through the first transmission line TL1 through the second output terminal OUT2 and the line data received through the second transmission line TL2 through the first output terminal OUT1 in response to the second selection signal SEL2.

Each of the first and second switching control signals CSF1 and CSF2 may indicate whether currently transmitted line data is one included in the first image DATA1 or one included in the second image DATA2.

The synchronization signal generator 418 may generate the third sync signal SYNC1' involved in the processing of the first output data LD1 and the fourth sync signal SYNC2' involved in the processing of the second output data LD2. The third sync signal SYNC1' may be generated based on both or either of the first and second sync signals SYNC1 and SYNC2. The fourth sync signal SYNC2' may also be generated based on both or either of the first and second sync signals SYNC1 and SYNC2.

It is assumed that both the imaging devices 310 and 320 operate in the capture mode and only the first ISP core 233-1 processes the images DATA1 and DATA2 captured by the respective imaging devices 310 and 320.

As shown in FIG. 7, when the phase of the first sync signal SYNC1 input at a first time point T11 leads the phase of the second sync signal SYNC2 input at a second time point T12, the switching determination circuit 410 may generate the second selection signal SEL2 for outputting the first line data LA1 of the first image DATA1, which is transmitted through the first transmission line TL1, to the first ISP core 233-1. At this time, the switching determination circuit 410 may generate the first selection signal SEL1 at the second level.

The second selection circuit 416 may transmit the first line data LA1 of the first image DATA1, which is received through the first transmission line TL1, to the first ISP core 233-1 as the first output data LD1. At this time, the synchronization signal generator 418 may transmit the third sync signal SYNC1', which is involved in the transmission (or processing) of the first output data LD1 (=LA1) to the first ISP core 233-1. The third sync signal SYNC1' may be generated based on the first sync signal SYNC1.

When the first line data LB1 of the second image DATA2 is input to the multiplexing control circuit 231A while the first line data LA1 of the first image DATA1 is being transmitted to the first ISP core 233-1, the switching determination circuit 410 may generate the first selection signal SEL1 at the second level so that the first line data LB1 of the second image DATA2 is transmitted to the line memory 414. Accordingly, the output line data SOUT of the first selection circuit 412, for example, the first line data LB1 of the second image DATA2 may be stored in the line memory 414.

When the first line data LA1 of the first image DATA1 is completely transmitted to the first ISP core 233-1, the switching determination circuit 410 may generate the second selection signal SEL2 for outputting the first line data LB1 of the second image DATA2 stored in the line memory 414 to the first ISP core 233-1. The second selection circuit 416 may transmit the output line data LOUT of the line memory 414, for example, the first line data LB1 of the second image DATA2 to the first ISP core 233-1 as the first output data LD1. At this time, the synchronization signal generator 418 may transmit the third sync signal SYNC1', which is involved in the transmission (or processing) of the first output data LD1 (=LB1) to the first ISP core 233-1. The third sync signal SYNC1' may be generated based on the second sync signal SYNC2.

When the phase of the first sync signal SYNC1 leads the phase of the second sync signal SYNC2, the switching determination circuit 410 may generate the second selection signal SEL2 for outputting the second line data LA2 of the first image DATA1 to the first ISP core 233-1. The second selection circuit 416 may transmit the second line data LA2 of the first image DATA1, which is received through the first transmission line TL1, to the first ISP core 233-1 as the first output data LD1. At this time, the synchronization signal generator 418 may transmit the third sync signal SYNC1', which is involved in the transmission (or processing) of the first output data LD1 (=LA2) to the first ISP core 233-1. The third sync signal SYNC1' may be generated based on the first sync signal SYNC1.

When the second line data LB2 of the second image DATA2 is input to the multiplexing control circuit 231A while the second line data LA2 of the first image DATA1 is being transmitted to the first ISP core 233-1, the switching determination circuit 410 may generate the first selection signal SEL1 at the second level so that the second line data LB2 of the second image DATA2 is transmitted to the line memory 414. Accordingly, the second line data LB2 of the second image DATA2 may be transmitted to the line memory 414 through the first selection circuit 412.

When the second line data LA2 of the first image DATA1 is completely transmitted to the first ISP core 233-1, the switching determination circuit 410 may generate the second selection signal SEL2 for outputting the second line data LOUT (=LB2) of the second image DATA2 from the line memory 414 to the first ISP core 233-1. The second selection circuit 416 may transmit the second line data LOUT, for example, the first line data LB2 of the second image DATA2 received from the line memory 414 to the first ISP core 233-1 as the first output data LD1. At this time, the synchronization signal generator 418 may transmit the third sync signal SYNC1', which involves in the transmission (or processing) of the first output data LD1 (=LB2) to the first ISP core 233-1. The third sync signal SYNC1' may be generated based on the second sync signal SYNC2.

The third line data LA3 of the first image DATA1 and the third line data LB3 of the second image DATA2 may also sequentially transmitted to the first ISP core 233-1 in the TDM mode. In other words, the line data LA1 through LAn of the first image DATA1 and the line data LB1 through LBm of the second image DATA2 may be subjected to TDM according to line data interleaving.

Figure 8:
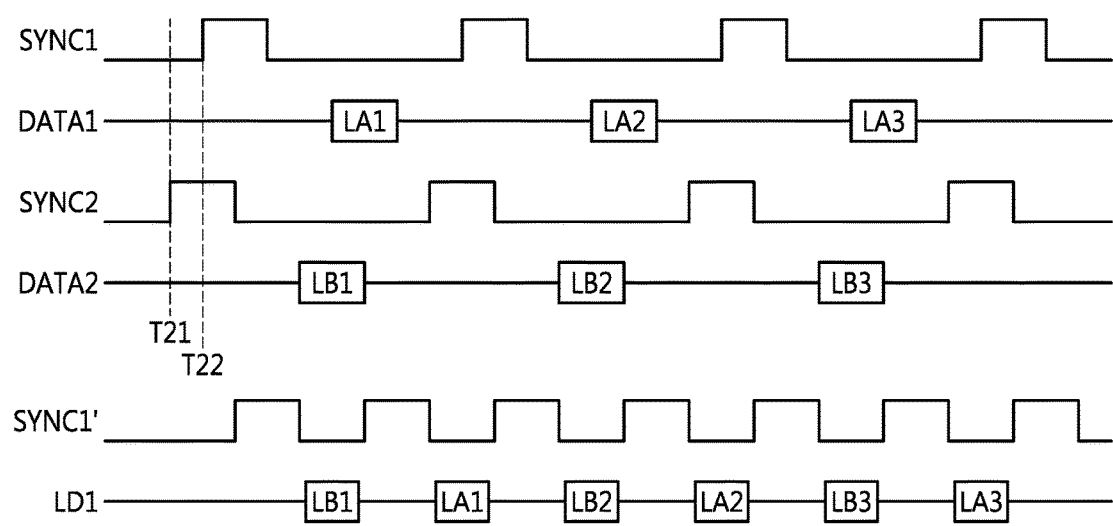
FIG. 8 is a timing chart showing time-division multiplexing of line data performed by the multiplexing control circuit illustrated in FIG. 6 according to another example embodiment of the inventive concepts.

As shown in FIG. 7, the line data LA1, LB1, LA2, LB2, LA3, and LB3 output from different imaging devices 310 and 320 may be transmitted in a single stream or in a single bitstream to the first ISP core 233-1. Alternatively, as shown in FIG. 8, the line data LB1, LA1, LB2, LA2, LB3, and LA3 output from different imaging devices 310 and 320 may be transmitted in a single stream or in a single bitstream to the first ISP core 233-1. The embodiments illustrated in FIGS. 7 and 8 are just provided to explain the inventive concepts and the order and the number of line data included in a single stream may be variously modified.

Figure 10:
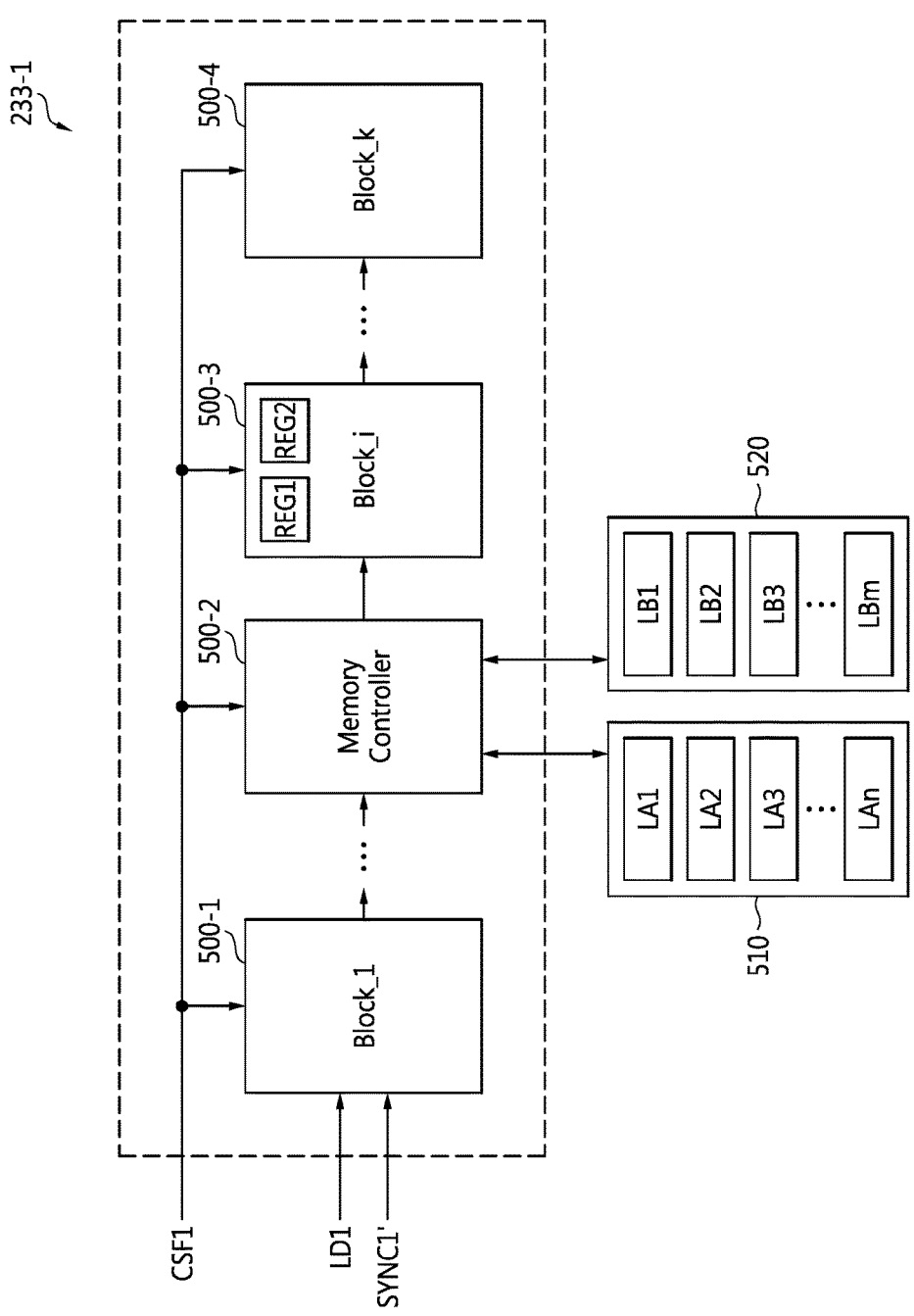
FIG. 10 is a detailed block diagram of a first ISP core illustrated in FIG. 2 or 3 according to an example embodiment of the inventive concepts.

FIG. 10 is a detailed block diagram of the first ISP core 233-1 illustrated in FIG. 2 or 3 according to an example embodiment of the inventive concepts. The structure of the first ISP core 233-1 is substantially the same as or similar to that of the second ISP core 233-2. Thus, only the structure and operations of the first ISP core 233-1 will be described with reference to FIG. 10.

Referring to FIG. 10, the first ISP core 233-1 may include elements 500-1 through 500-4 connected in series. The elements 500-1 through 500-4 may form a chain or a pipeline. The elements 500-1, 500-2, and 500-4 may be processing circuits that process line data. For instance, the elements 500-1, 500-2, and 500-4 may perform at least one among auto dark level compensation, bad pixel replacement, noise reduction, lens shading compensation, color correction, RGB gamma correction, edge enhancement, hue control, and color suppress.

The first switching control signal CSF1 may control the operation of the elements 500-1 through 500-4. The first block 500-1 may receive the first switching control signal CSF1, the first output data LD1, and the third sync signal SYNC1' and may process the first output data LD1 based on the first switching control signal CSF1 and the third sync signal SYNC1'.

The memory controller 500-2 may store line data output from a previous element in a first buffer 510 or a second buffer 520 in response to the first switching control signal CSF1. The first buffer 510 may be used to store the line data LA1 through LAn, which is included in the first image DATA1 and the second buffer 520 may be used store the line data LB1 through LBm, which is included in the second image DATA2.

The i-th block 500-3 may include a first register REG1 and a second register REG2. The first register REG1 may store first parameters used to process the line data LA1 through LAn included in the first image DATA1. The second register REG2 may store second parameters used to process the line data LB1 through LBm included in the second image DATA2. The first switching control signal CSF1 may be used to program or set the first parameters in the first register REG1 and to program or set the second parameters in the second register REG2. At least one of the elements 500-1, 500-2, and 500-4 may process the line data LA1 through LAn included in the first image DATA1 using the first parameters and may process the line data LB1 through LBm included in the second image DATA2 using the second parameters.

The k-th block 500-4 may process data output from a previous element based on the first switching control signal CSF1 and may output processed data to the scaling/formatting circuit 235.

For instance, when the first line data LA1 of the first image DATA1 is firstly input to the first ISP core 233-1, as shown in FIG. 7, the first ISP core 233-1 may change the configuration of the elements 500-1 through 500-4 to process the first line data LA1 in response to the first switching control signal CSF1, which instructs to process the first line data LA1. When the first line data LB1 of the second image DATA2 is secondly input to the first ISP core 233-1, the first ISP core 233-1 may change the configuration of the elements 500-1 through 500-4 to process the first line data LB1 in response to the first switching control signal CSF1, which instructs to process the first line data LB1. When the second line data LA2 of the first image DATA1 is thirdly input to the first ISP core 233-1, the first ISP core 233-1 may change the configuration of the elements 500-1 through 500-4 to process the second line data LA2 in response to the first switching control signal CSF1, which instructs to process the second line data LA2.

In other words, the first ISP core 233-1 may change the configuration of the elements 500-1 through 500-4 to process a current line data in response to the first switching control signal CSF1, which indicates whether the current line data is one included in the first image DATA1 or one included in the second image DATA2. For example, when the current line data is one included in the first image DATA1, the elements 500-1 through 500-4 of the first ISP core 233-1 may be set to have a first configuration. When the current line data is one included in the second image DATA2, the elements 500-1 through 500-4 of the first ISP core 233-1 may be set to have a second configuration.

It is assumed that both the imaging devices 310 and 320 operate in the capture mode and the first ISP core 233-1 exclusively processes the images DATA1 and DATA2 captured by the respective imaging devices 310 and 320. When the phase of the first sync signal SYNC1 input at a fourth time point T22 lags behind the phase of the second sync signal SYNC2 input at a third tune point T21, as shown in FIG. 8, the multiplexing control circuit 231A may transmit the first line data LB1 of the second image DATA2 to the first ISP core 233-1 prior to the first line data LA1 of the first image DATA1.

The switching determination circuit 410 may generate the second selection signal SEL2 for outputting the first line data LB1 of the second image DATA2 to the first ISP core 233-1. At this time, the switching determination circuit 410 may generate the first selection signal SEL1 at the first level.

The second selection circuit 416 may transmit the first line data LB1 of the second image DATA2, which is received through the second transmission line TL2, to the first ISP core 233-1 as the first output data LD1. At this time, the synchronization signal generator 418 may transmit the third sync signal SYNC1', which is involved in the processing of the first output data LD1, for example, LB1 to the first ISP core 233-1. The third sync signal SYNC1' may be generated based on the second sync signal SYNC2.

When the first line data LA1 of the first image DATA1 is input to the multiplexing control circuit 231A while the first line data LB1 of the second image DATA2 is being transmitted to the first ISP core 233-1, the switching determination circuit 410 may generate the first selection signal SEL1 at the first level so that the first line data LA1 of the first image DATA1 is transmitted to the line memory 414. The first selection circuit 412 may transmit the first line data LA1 of the first image DATA1 to the line memory 414 in response to the first selection signal SEL1 at the first level. Accordingly, the line memory 414 may store the first line data LA1 of the first image DATA1.

When the first line data LB1 of the second image DATA2 is completely transmitted to the first ISP core 233-1, the switching determination circuit 410 may generate the second selection signal SEL2 for outputting the first line data LA1 of the first image DATA1 stored in the line memory 414 to the first ISP core 233-1. The second selection circuit 416 may transmit the first line data LOUT, for example, LA1 of the first image DATA1 from the line memory 414 to the first ISP core 233-1 as the first output data LD1. At this time, the synchronization signal generator 418 may transmit the third sync signal SYNC1', which is involved in the processing of the first output data LD1, for example, LA1 to the first ISP core 233-1. The third sync signal SYNC1' may be generated based on the first sync signal SYNC1.

When the phase of the first sync signal SYNC1 lags behind the phase of the second sync signal SYNC2, the switching determination circuit 410 may generate the second selection signal SEL2 for outputting the second line data LB2 of the second image DATA2 to the first ISP core 233-1. At this time, the switching determination circuit 410 may generate the first selection signal SEL1 at the first level.

The second selection circuit 416 may transmit the second line data LB2 of the second image DATA2, which is received through the second transmission line TL2, to the first ISP core 233-1 as the first output data LD1. At this time, the synchronization signal generator 418 may transmit the third sync signal SYNC1', which is involved in the processing of the first output data LD1 (=LB2) to the first ISP core 233-1. The third sync signal SYNC1' may be generated based on the second sync signal SYNC2.

When the second line data LA2 of the first image DATA1 is input to the multiplexing control circuit 231A while the second line data LB2 of the second image DATA2 is being transmitted to the first ISP core 233-1, the switching determination circuit 410 may generate the first selection signal SEL1 at the first level so that the second line data LA2 of the first image DATA1 is transmitted to the line memory 414. At this time, the first selection circuit 412 may transmit the second line data LA2 of the first image DATA1 to the line memory 414 in response to the first selection signal SEL1 at the first level. Accordingly, the line memory 414 may store the second line data LA2 of the first image DATA1.

When the second line data LB2 of the second image DATA2 is completely transmitted to the first ISP core 233-1, the switching determination circuit 410 may generate the second selection signal SEL2 for outputting the second line data LA2 of the first image DATA1 to the first ISP core 233-1. The second selection circuit 416 may transmit the second line data LOUT, for example, LA2 of the first image DATA1, which is received from the line memory 414, to the first ISP core 233-1 as the first output data LD1. At this time, the synchronization signal generator 418 may transmit the third sync signal SYNC1' involved in the processing of the first output data LD1, for example, LA2 to the first ISP core 233-1. The third sync signal SYNC1' may be generated based on the first sync signal SYNC1.

The third line data LB3 of the second image DATA2 and the third line data LA3 of the first image DATA1 may also sequentially transmitted to the first ISP core 233-1 in the TDM mode. In other words, the line data LB1 through LBm of the second image DATA2 and the line data LA1 through LAn of the first image DATA1 may be subjected to TDM according to line data interleaving.

The memory controller 500-2 may store data output from a previous element in a first buffer 510 or a second buffer 520 in response to the first switching control signal CSF1. For instance, when the first line data LB1 of the second image DATA2 is firstly input to the first ISP core 233-1, as shown in FIG. 8, the first ISP core 233-1 may change the configuration of the elements 500-1 through 500-4 to process the first line data LB1 in response to the first switching control signal CSF1, which instructs to process the first line data LB1.

When the first line data LA1 of the first image DATA1 is secondly input to the first ISP core 233-1, the first ISP core 233-1 may change the configuration of the elements 500-1 through 500-4 to process the first line data LA1 in response to the first switching control signal CSF1, which instructs to process the first line data LA1. When the second line data LB2 of the second image DATA2 is thirdly input to the first ISP core 233-1, the first ISP core 233-1 may change the configuration of the elements 500-1 through 500-4 to process the second line data LB2 in response to the first switching control signal CSF1, which instructs to process the second line data LB2.

In other words, the first ISP core 233-1 may change the configuration of the elements 500-1 through 500-4 with respect to each line data to process a current line data in response to the first switching control signal CSF1, which indicates whether the current line data is one included in the first image DATA1 or one included in the second image DATA2.

Figure 9:
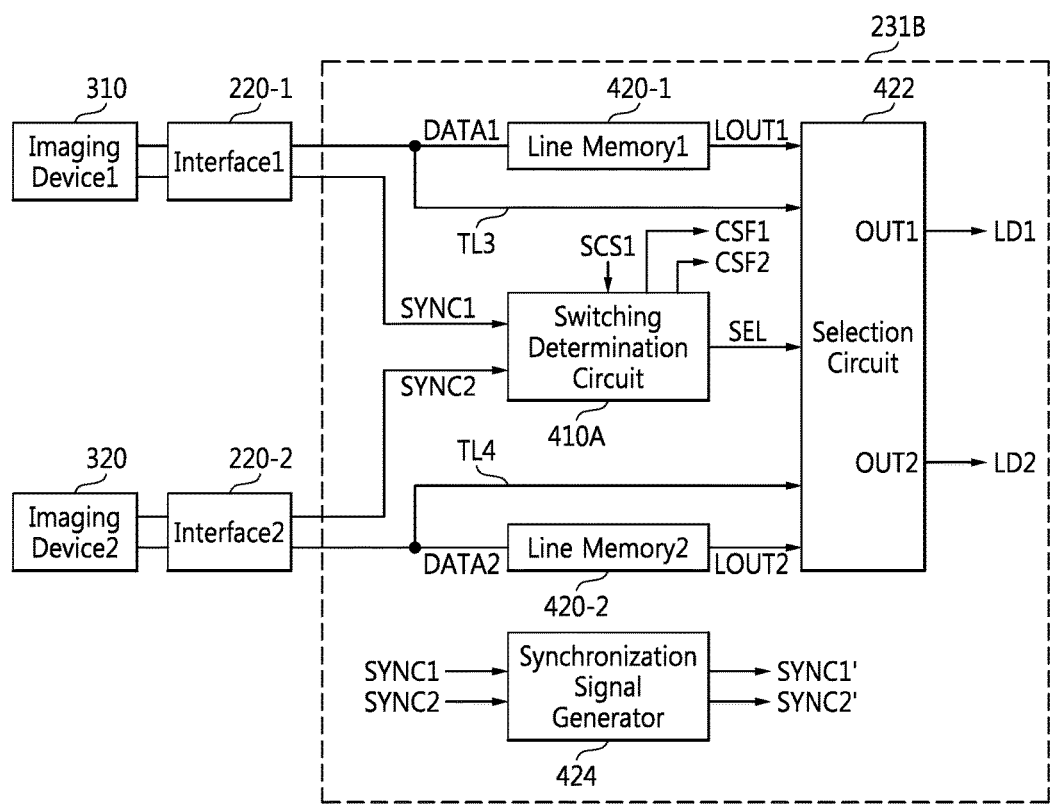
FIG. 9 is a block diagram showing another example of the multiplexing control circuit illustrated in FIG. 2 or 3.

FIG. 9 is a block diagram showing another example of the multiplexing control circuit 231 illustrated in FIG. 2 or 3. Referring to FIG. 9, a multiplexing control circuit 231B may include a switching determination circuit 410A, a first line memory 420-1, a second line memory 420-2, a selection circuit 422, and a synchronization signal generator 424.

The first line memory 420-1 may store line data included in the first image DATA1 and may transmit stored line data LOUT1 to the selection circuit 422. The second line memory 420-2 may store line data included in the second image DATA2 and may transmit stored line data LOUT2 to the selection circuit 422. Each of the first line memory 420-1 and the second line memory 420-2 may be implemented as, for example, a FIFO memory.

The synchronization signal generator 424 may generate the third sync signal SYNC1' based on the first sync signal SYNC1 and may generate the fourth sync signal SYNC2' based on the second sync signal SYNC2. According to some example embodiments, the synchronization signal generator 424 may generate the third sync signal SYNC1' based on both the first and second sync signals SYNC1 and SYNC2.

The switching determination circuit 410A may generate a selection signal SEL based on the first mode control signal SCS1, the first sync signal SYNC1, and the second sync signal SYNC2 and may also generate the first and second switching control signals CSF1 and CSF2.

When the phase of the first sync signal SYNC1 leads the phase of the second sync signal SYNC2, as shown in FIG. 7, each line data included in the first image DATA1 may be transmitted, as the first output data LD1, to the first ISP core 233-1 through a third transmission line TL3 and the first output terminal OUT1 of the selection circuit 422 and each line data included in the second image DATA2 may be transmitted, as the first output data LD1, to the first ISP core 233-1 through the second line memory 420-2 and the first output terminal OUT1 of the selection circuit 422.

Consequently, the multiplexing control circuit 231B may sequentially transmit the line data LA1, LB1, LA2, LB2, LB2, LA3, and LB3 to the first ISP core 233-1 in TDM mode. Further, the multiplexing control circuit 231B may also transmit the third sync signal SYNC1' to the first ISP core 233-1 together with each of the line data LA1, LB1, LA2, LB2, LA3, and LB3. The third sync signal SYNC may be generated based on the first and second sync signals SYNC1 and SYNC2.

When the phase of the first sync signal SYNC1 lags behind the phase of the second sync signal SYNC2, as shown in FIG. 8; each line data included in the second image DATA2 may be transmitted, as the first output data LD1, to the first ISP core 233-1 through a fourth transmission line TL4 and the first output terminal OUT1 of the selection circuit 422 and each line data included in the first image DATA1 may be transmitted, as the first output data LD1, to the first ISP core 233-1 through the first line memory 420-1 and the first output terminal OUT1 of the selection circuit 422.

Consequently, the multiplexing control circuit 231B may sequentially transmit the line data LB1, LA1, LB2, LA2, LB3, and LA3 to the first ISP core 233-1 in TDM mode. Further, the multiplexing control circuit 231B may also transmit the third sync signal SYNC1' to the first ISP core 233-1 together with each of the line data LB1, LA1, LB2, LA2, LB3, and LA3. The third sync signal SYNC1' may be generated based on the first and second sync signals SYNC1 and SYNC2.

FIG. 11 is a block diagram showing still another example of the ISP 230 illustrated in FIG. 1. Referring to FIG. 11, an ISP 230B may include a first ISP core 601, a second ISP core 603, and a scaling/formatting circuit 605.

The first ISP core 601 may receive the first sync signal SYNC1 and the first image DATA1 from the first imaging device 310, process the first image DATA1, and generate a third image PDATA1 and the first sync signal SYNC1. Although it is illustrated in FIG. 11 that the first sync signal SYNC1 input to the first ISP core 601 is the same as the first sync signal SYNC1 output from the first ISP core 601, the first sync signal SYNC1 input to the first ISP core 601 may be different from the first sync signal SYNC1 output from the first ISP core 601.

The second ISP core 602 may receive the second sync signal SYNC2 and the second image DATA2 from the second imaging device 320, process the second image DATA2, and generate a fourth image PDATA2 and the second sync signal SYNC2. Although it is illustrated in FIG. 11 that the second sync signal SYNC2 input to the second ISP core 603 is the same as the second sync signal SYNC2 output from the second ISP core 603, the second sync signal SYNC2 input to the second ISP core 603 may be different from the second sync signal SYNC2 output from the second ISP core 603.

The scaling/formatting circuit 605 may include a multiplexing control circuit 607, a first scaler 609, a second scaler 611, and a formatting circuit 613. A first scaling ratio of the first scaler 609 may be the same as or different from a second scaling ratio of the second scaler 611. The first scaling ratio and the second scaling ratio may be changed.

The multiplexing control circuit 607 may transmit each of line data included in the third image PDATA1 to the first scaler 609 or the second scaler 611 based on a second mode control signal SCS2 and the first and second sync signals SYNC1 and SYNC2. The multiplexing control circuit 607 may also transmit each of line data included in the fourth image PDATA2 to the first scaler 609 or the second scaler 611 based on the second mode control signal SCS2 and the first and second sync signals SYNC1 and SYNC2.

The multiplexing control circuit 607 may output first output data SDATA1 to the first scaler 609 according to the second mode control signal SCS2. According to the operating modes of the imaging devices 310 and 320, the first output data SDATA1 may include each line data included in the fourth image PDATA2 or may include at least one line data among a plurality of line data included in the third image PDATA1 and at least one line data among a plurality of line data included in the fourth image PDATA2.

When the first scaler 609 exclusively processes a captured image, the first imaging device 310 may perform a first operation (e.g., an image capturing operation), and the second imaging device 320 may perform a second operation (e.g., a pre-view operation) according to the operating modes of the imaging devices 310 and 320. The multiplexing control circuit 607 may transmit the third image PDATA1 received from the first ISP core 601 to the first scaler 609 as the first output data SDATA1 and may transmit the fourth image PDATA2 received from the second ISP core 603 to the second scaler 611 as second output data SDATA2. At this time, the multiplexing control circuit 607 may transmit a sync signal to the first scaler 609 together with the first output data SDATA1 and further may transmit to the first scaler 609 a first scaler control signal CTRL1, which indicates that line data included in the first output data SDATA1 is from the third image PDATA1. At this time, the sync signal may be generated based on the first sync signal SYNC1. Further, the multiplexing control circuit 607 may transmit a sync signal to the second scaler 611 together with the second output data SDATA2 and further may transmit to the second scaler 611a second scaler control signal CTRL2, which indicates that line data included in the second output data SDATA2 is from the fourth image PDATA2. At this time, the sync signal may be generated based on the second sync signal SYNC2.

The first scaler 609 may set its elements to process each line data included in the first output data SDATA1 according to the first scaler control signal CTRL1. The second scaler 611 may set its elements to process each line data included in the second output data SDATA2 according to the second scaler control signal CTRL2.

When the first scaler 609 exclusively processes a captured image, the first imaging device 310 may perform the second operation (e.g., the pre-view operation), and the second imaging device 320 may perform the first operation (e.g., the image capturing operation) according to the operating modes of the imaging devices 310 and 320. The multiplexing control circuit 607 may transmit the fourth image PDATA2 received from the second ISP core 603 to the first scaler 609 as the first output data SDATA1 and may transmit the third image PDATA1 received from the first ISP core 601 to the second scaler 611 as the second output data SDATA2. At this time, the multiplexing control circuit 607 may transmit a sync signal to the first scaler 609 together with the first output data SDATA1 (e.g., PDATA2) and further may transmit to the first scaler 609 the first scaler control signal CTRL1 which indicates that line data included in the first output data SDATA1 (e.g., PDATA2) is from the fourth image PDATA2. At this time, the sync signal may be generated based on the second sync signal SYNC2. Further, the multiplexing control circuit 607 may transmit a sync signal to the second scaler 611 together with the second output data SDATA2 (e.g., PDAT1) and further may transmit the second scaler control signal CTRL2 to the second scaler 611, which indicates that line data included in the second output data SDATA2 (=PDAT1) is from the third image PDATA1. At this time, the sync signal may be generated based on the first sync signal SYNC1.

The first scaler 609 may set its elements to process each line data included in the first output data SDATA1 (e.g., PDAT2) according to the first scaler control signal CTRL1. The second scaler 611 may set its elements to process each line data included in the second output data SDATA2 (e.g., PDAT1) according to the second scaler control signal CTRL2.

When the first scaler 609 exclusively processes a captured image and both the first and second imaging devices 310 and 320 perform the first operation (e.g., an image capturing operation) according to the operating modes of the imaging devices 310 and 320, the multiplexing control circuit 607 may transmit the third image PDATA1 received from the first ISP core 601 to the first scaler 609 as the first output data SDATA1 (e.g., PDATA1) and further may transmit the fourth image PDATA2 received from the second ISP core 603 to the first scaler 609 as the first output data SDATA1 (=PDATA2). At this time, the multiplexing control circuit 607 may transmit a sync signal to the first scaler 609 together with the first output data SDATA1 and may also transmit to the first scaler 609 the first scaler control signal CTRL1, which indicates that line data included in the first output data SDATA1 is from either the third image PDATA1 or the fourth image PDATA2. At this time, the sync signal may be generated based on both the first and second sync signals SYNC1 and SYNC2.

At this time, the first output data SDATA1 may include at least one line data among the line data included in the third image PDATA1 and at least one line data among the line data included in the fourth image PDATA2. In other words, the multiplexing control circuit 607 may transmit time-divided line data to the first scaler 609 using line data interleaving.

The first scaler 609 may perform a scaling operation on the first output data SDATA1 according to the first scaler control signal CTRL and output a first scaled image SDATA3. The second scaler 611 may perform a scaling operation on the second output data SDATA2 according to the second scaler control signal CTRL2 and output a second scaled image SDATA4. The scaling operation performed by each of the scalers 609 and 611 may be a scale-up operation or a scale-down operation. The scale-up operation may refer to up-scaling or up-sampling and the scale-down operation may refer to down-scaling or down-sampling.

Each of the scalers 609 and 611 may store the first output data SDATA1 and/or the second output data SDATA2 in a buffer 620. The first output data SDATA1 may be stored in a first memory area 621 of the buffer 620 and the second output data SDATA2 may be stored in a second memory area 622 of the buffer 620.

Each of the scalers 609 and 611 may perform scaling using a plurality of line data LA1, LA2, ... included in the first output data SDATA1, which is stored in the buffer 620 and/or a plurality of line data LB1, LB2, ... included in the second output data SDATA2, which is stored in the buffer 620. The formatting circuit 613 may decide formats of the scaled images SDATA3 and SDATA4, which are respectively output from the scalers 609 and 611.

Figure 12:
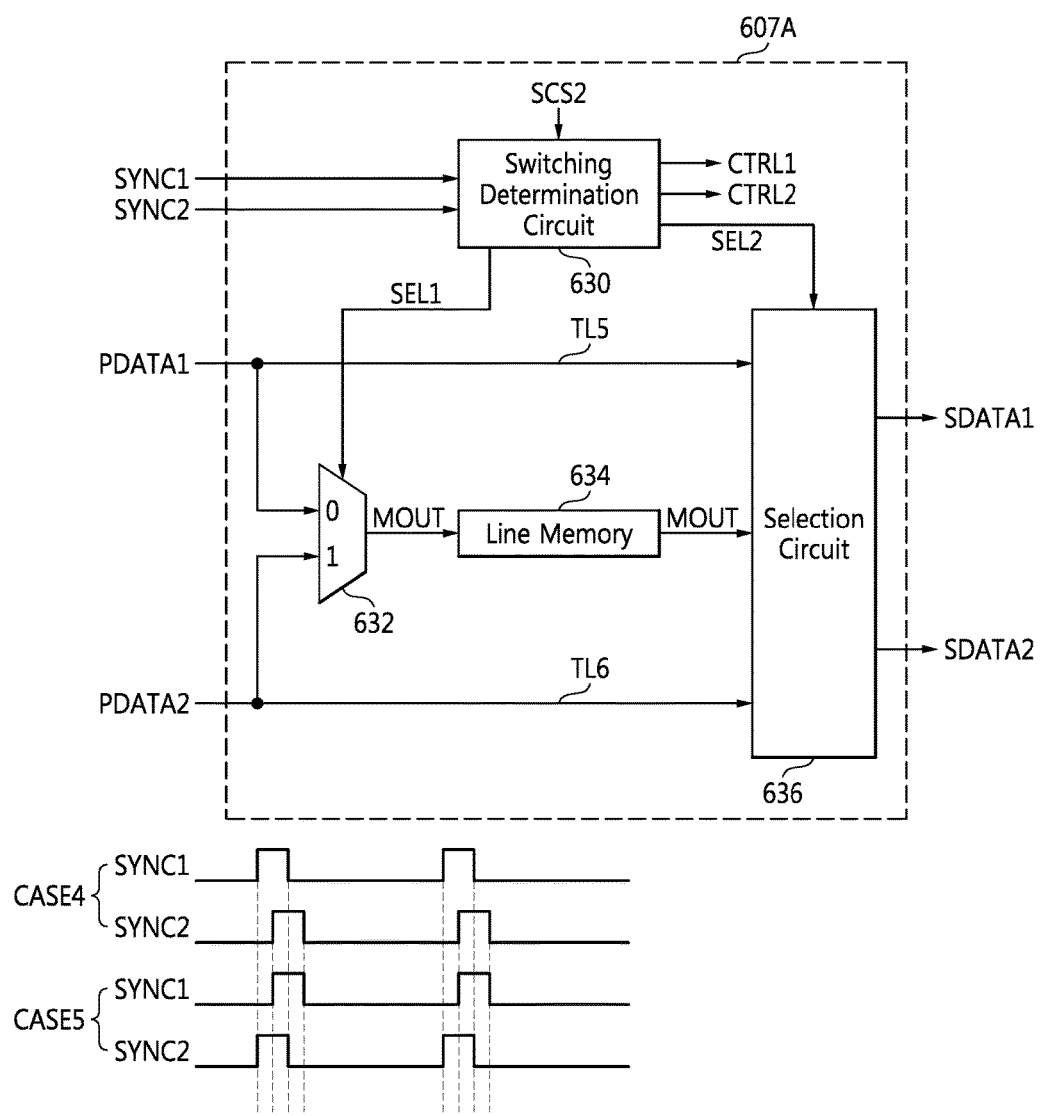
FIG. 12 is a block diagram showing an example of a multiplexing control circuit illustrated in FIG. 11.

FIG. 12 is a block diagram showing an example of the multiplexing control circuit 607 illustrated in FIG. 11. Referring to FIG. 12, a multiplexing control circuit 607A may include a switching determination circuit 630, a first selection circuit 632, a line memory 634, and a second selection circuit 636.

The second mode control signal SCS2 may be an indicator signal indicating an operation of each of the scalers 609 and 611. It is assumed that the first scaler 609 is one that is configured to scale a captured image and the first and second imaging devices 310 and 320 are operating in the capture mode.

When the phase of the first sync signal SYNC1 leads the phase of the second sync signal SYNC2 in CASE4, the multiplexing control circuit 607A processes line data included in the third image PDATA1 and line data included in the fourth image PDATA2 in timings substantially the same as or similar to those shown in the timing chart of FIG. 7. Each of the line data included in the third image PDATA1, which is related to the first sync signal SYNC1, may be transmitted, as the first output data SDATA1, to the first scaler 609 through a fifth transmission line TL5 and the second selection circuit 636. Each of the line data included in the fourth image PDATA2, which is related to the second sync signal SYNC2 may be transmitted, as the first output data SDATA1, to the first scaler 609 through the first selection circuit 632, the line memory 634, and the second selection circuit 636.

The switching determination circuit 630 may output the first selection signal SEL1 at the second level. The first selection circuit 632 may output line data included in the fourth image PDATA2 as an output signal MOUT in response to the first selection signal SEL1 at the second level. The line memory 634 may output the line data MOUT received from the first selection circuit 632 to the second selection circuit 636 as output data MOUT. The second selection circuit 636 may output, as the first output data SDATA1, either line data included in the third image PDATA1 received through the fifth transmission line 115 or line data included in the fourth image PDATA2 received from the line memory 634.

When the phase of the first sync signal SYNC1 lags behind the phase of the second sync signal SYNC2 in CASE5, the multiplexing control circuit 607A may process line data included in the fourth image PDATA2 and line data included in the third image PDATA1 in timings substantially the same as or similar to those shown in the timing chart of FIG. 8. Each of the line data included in the fourth image PDATA2, which is related to the second sync signal SYNC2, may be transmitted, as the first output data SDATA1, to the first scaler 609 through a sixth transmission line TL6 and the second selection circuit 636. Each of the line data included in the third image PDATA1, which is related to the first sync signal SYNC1, may be transmitted, as the first output data SDATA1, to the first scaler 609 through the first selection circuit 632, the line memory 634, and the second selection circuit 636.

The switching determination circuit 630 may output the first selection signal SEL1 at the first level. The first selection circuit 632 may output line data included in the third image PDATA1 as the output signal MOUT in response to the first selection signal SEL1 at the first level. The line memory 634 may output the line data MOUT received from the first selection circuit 632 to the second selection circuit 636 as output data MOUT. The second selection circuit 636 may output, as the first output data SDATA1, either line data included in the fourth image PDATA2 received through the sixth transmission line TL6 or line data included in the third image PDATA1 received from the line memory 634.

Figure 13A:
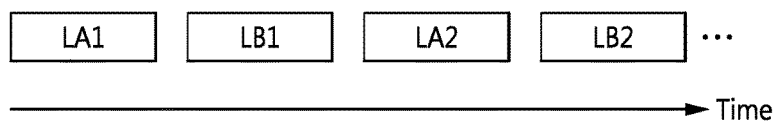
FIGS. 13A through 13C are timing charts showing time-division multiplexing of line data performed by the multiplexing control circuit illustrated in FIG. 12 according to an example embodiment of the inventive concepts.
Figure 13B:
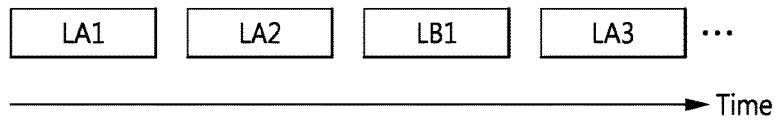
Figure 13C:
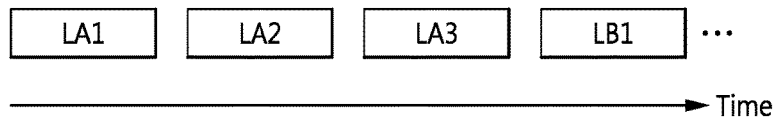

FIGS. 13A through 13C are timing charts showing TDM of line data performed by the multiplexing control circuit 607A illustrated in FIG. 12 according to an example embodiment of the inventive concepts. Referring to FIG. 13A, the multiplexing control circuit 607A may output the first line data LA1 included in the third image PDATA1, the first line data LB1 included in the fourth image PDATA2, the second line data LA2 included in the third image PDATA1, and the second line data LB2 included in the fourth image PDATA2 to the first scaler 609 as the first output data SDATA1. As shown in FIG. 13A, the line data LA1, LB1, LA2, LB2, . . . alternately output from the imaging devices 310 and 320 may be transmitted in a single stream or a single bitstream to the first scaler 609.

Referring to FIG. 13B, the multiplexing control circuit 607A may transmit two line data LA1 and LA2 included in the third image PDATA1 and one line data LB1 included in the fourth image PDATA2 to the first scaler 609 as the first output data SDATA1. As shown in FIG. 13B, the line data LA1, LA2, LB1, LA3, . . . output from the imaging devices 310 and 320 may be transmitted in a single stream or a single bitstream to the first scaler 609 in a way that one line data output from the second imaging device 320 is transmitted after two line data output from the first imaging device 310 are transmitted.

Referring to FIG. 13C, the multiplexing control circuit 607A may transmit three line data LA1, LA2, and LA3 included in the third image PDATA1 and one line data LB1 included in the fourth image PDATA2 to the first scaler 609 as the first output data SDATA1 As shown in FIG. 13C, the line data LA1, LA2, LA3, LB1, . . . output from the imaging devices 310 and 320 may be transmitted in a single stream or a single bitstream to the first scaler 609 in a way that one line data output from the second imaging device 320 is transmitted after three line data output from the first imaging device 310 are transmitted. The number and order of line data included in a single stream or a single bitstream may be variously changed.

Figure 14:
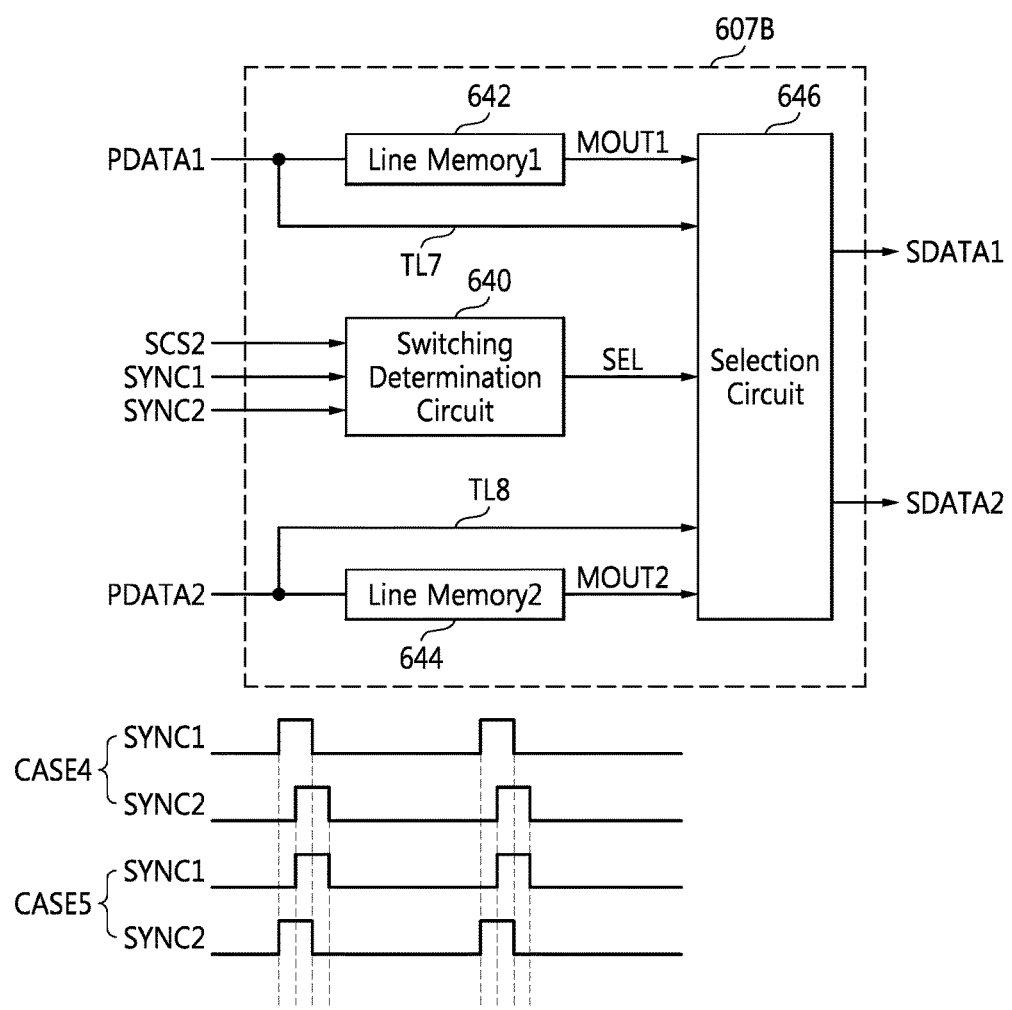
FIG. 14 is a block diagram showing another example of the multiplexing control circuit illustrated in FIG. 11.

FIG. 14 is a block diagram showing another example of the multiplexing control circuit 607 illustrated in FIG. 11. Referring to FIG. 14, an multiplexing control circuit 607B may include a switching determination circuit 640, a first line memory 642, a second line memory 644, and a selection circuit 646.

The second mode control signal SCS2 may be an indicator signal indicating an operation of each of the scalers 609 and 611. It is assumed that the first scaler 609 is one that is configured to scale a captured image and the first and second imaging devices 310 and 320 are operating in the capture mode.

When the phase of the first sync signal SYNC1 leads the phase of the second sync signal SYNC2 in CASE4, the multiplexing control circuit 607B processes line data included in the third image PDATA1 and line data included in the fourth image PDATA2 in timings substantially the same as or similar to those shown in the timing chart of FIG. 7. Each of the line data included in the third image PDATA1 related to the first sync signal SYNC1 may be transmitted, as the first output data SDATA1, to the first scaler 609 through a seventh transmission line TL7 and the selection circuit 646. Each of the line data included in the fourth image PDATA2, which is related to the second sync signal SYNC2 may be transmitted, as the first output data SDATA1, to the first scaler 609 through the second line memory 644 and the selection circuit 646.

The selection circuit 646 may output, as the first output data SDATA1, either line data included in the third image PDATA1 received through the seventh transmission line TL7 or line data MOUT2 included in the fourth image PDATA2 received from the second line memory 644.

When the phase of the first sync signal SYNC1 lags behind the phase of the second sync signal SYNC2 in CASE5, the multiplexing control circuit 607B may process line data included in the fourth image PDATA2 and line data included in the third image PDATA1 in timings substantially the same as or similar to those shown in the timing chart of FIG. 8. Each of the line data included in the fourth image PDATA2, which is related to the second sync signal SYNC2, may be transmitted, as the first output data SDATA1, to the first scaler 609 through an eighth transmission line TL8 and the selection circuit 646. Each of the line data included in the third image PDATA1 related to the first sync signal SYNC1 is transmitted, as the first output data SDATA1, to the first scaler 609 through the first line memory 642 and the selection circuit 646.

The selection circuit 646 may output, as the first output data SDATA1, either line data included in the fourth image PDATA2 received through the eighth transmission line TL8 or line data MOUT1, which relates to the third image PDATA1 and received from the first line memory 642. The selection circuit 646 may transmit, as the first output data SDATA1, line data included in the image PDATA1 or PDATA2 to the first scaler 609 according to line data interleaving shown in FIG. 13A, 13B, or 13C.

Figure 15:
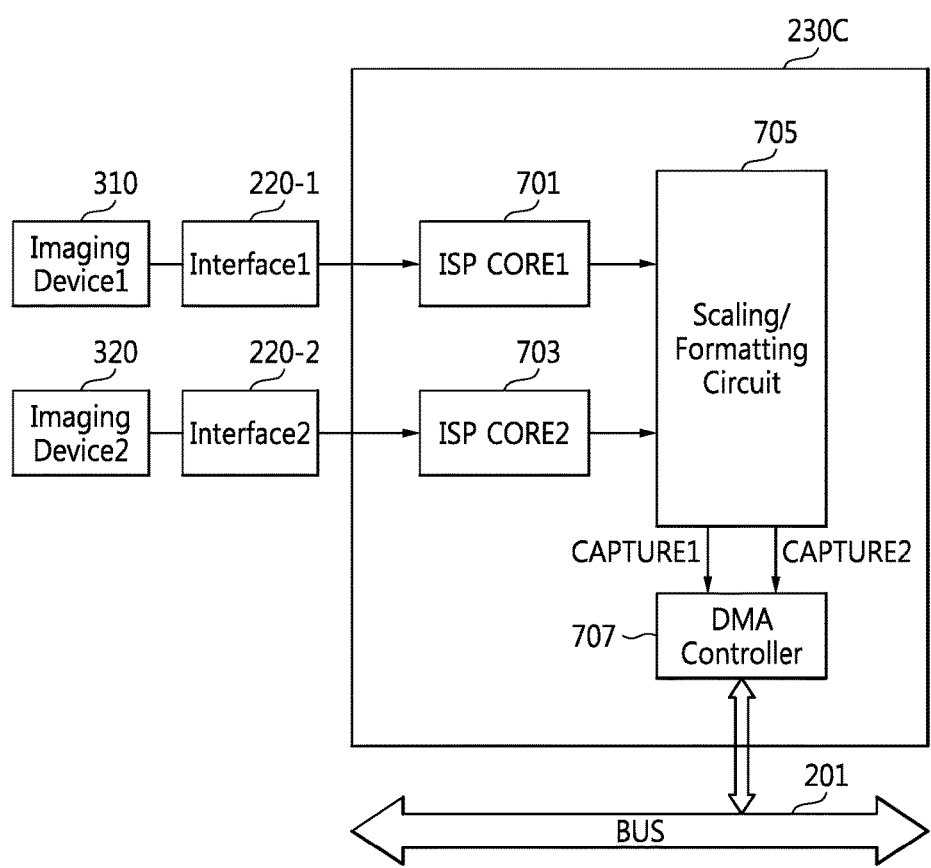
FIG. 15 is a block diagram showing yet another example of the ISP illustrated in FIG. 1.

FIG. 15 is a block diagram showing yet another example of the ISP 230 illustrated in FIG. 1. Referring to FIG. 15, an SP 230C may include a first ISP core 701, a second ISP core 702, a scaling/formatting circuit 705, and a DMA controller 707.

The first ISP core 701 may receive a first image from the first imaging device 310 through a first interface 220-1, process the first image, and transmit the processed first image to the scaling/formatting circuit 705. The second ISP core 702 may receive a second image from the second imaging device 320 through a second interface 220-2, process the second image, and transmit the processed second image to the scaling/formatting circuit 705.

It is assumed that the first image is a captured image and the second image is for pre-view. At this time, the scaling/formatting circuit 705 may convert the first image into a first format to generate a first image CAPTURE1 in the first format and may convert the second image into a second format to generate a second image CAPTURE2 in the second format. The scaling/formatting circuit 705 may transmit the first image CAPTURE1 in the first format and the second image CAPTURE2 in the second format to the bus architecture 201 using the DMA controller 707.

Figure 16:
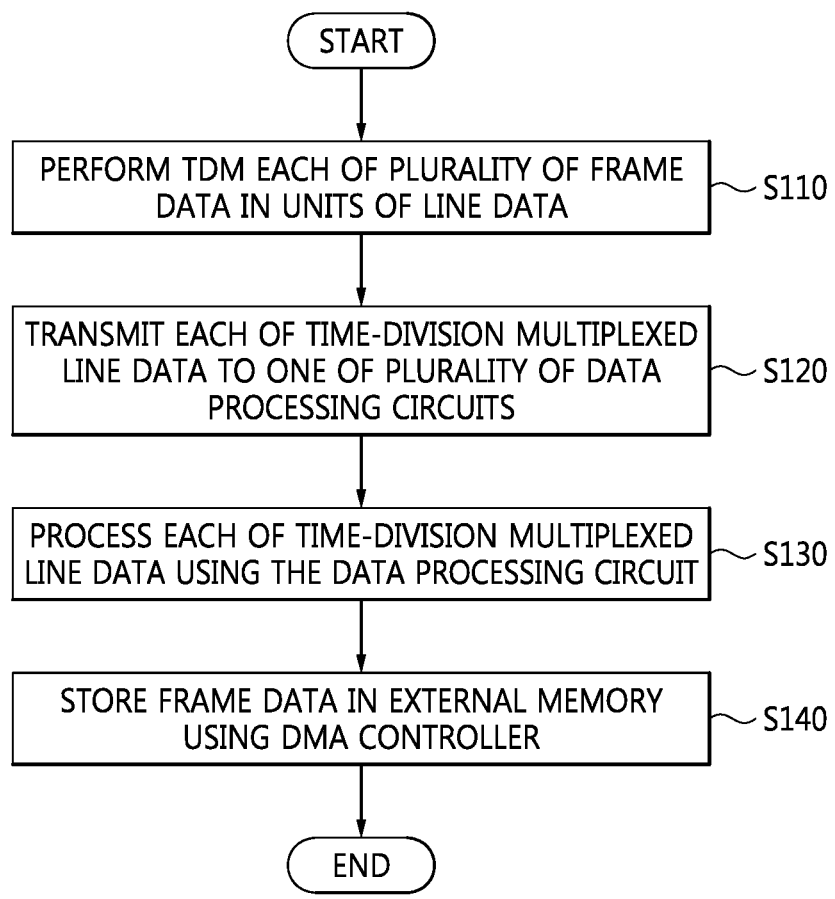
FIG. 16 is a flowchart of a method of operating the ISP illustrated in FIG. 1 according to an example embodiment of the inventive concepts.

FIG. 16 is a flowchart of a method of operating the ISP 230 illustrated in FIG. 1 according to an example embodiment of the inventive concepts. The ISP 230 may perform TDM on a plurality of frame data DATA1 and DATA2, which are respectively output from the imaging devices 310 and 320 in units of line data in operation S110.

The ISP 230 may transmit each of time-division multiplexed line data to one of a plurality of data processing circuits in operation S120. The data processing circuits may be ISP cores or scalers.

The ISP 230 may process each of the time-division multiplexed line data using one data processing circuit in operation S130. The ISP 230 may store each line data processed by the data processing circuit in the external memory 330 in units of frame data using a DMA controller in operation S140.

As described above, according to some example embodiments of the inventive concepts, an ISP including a line memory minimizes usage of a memory resource (e.g., external frame memory or system memory such as DRAM) accessed by the ISP. The ISP may process each line in frame data output from each of data processing circuit in a time-division mode using the line memory without using external frame memory or system memory. The ISP may use the internal line memory instead of the external frame memory. Thus, usage of the external frame memory and/or excessive usage of the system memory due to memory footprint can be reduced. Further, the ISP including the line memory solves the problem of excessive use of a system resource (e.g., bus, external frame memory, and/or system memory) caused by bus transactions to access the external frame memory and/or the system memory. Moreover, the ISP may reduce power consumed to perform the foregoing bus transactions. Still further, time division performance of the ISP may not restricted by the bandwidth of the external frame memory and/or the system memory.

While the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

What is claimed is:

1. An image signal processor comprising:
   a first data processing circuit configured to process first image data and/or second image data in a first operating mode, and a second data processing circuit configured to process the first image data and/or the second image data in a second operating mode, in units of line data in a time-division-multiplexing (TDM) mode on the fly, the first image data and the second image data being data output from respective ones of imaging devices, the first operating mode being different from the second operating mode; and
   a multiplexing control circuit configured to transmit, first line data included in the first image data and second line data included in the second image data to the first data processing circuit in the TDM mode in a line by line manner in the first operating mode, and
   a switching control signal to the first data processing circuit to cause the first data processing circuit to configure elements therein to process current line data, the switching control signal indicating whether the current line data to be transmitted to the first data processing circuit is the first line data or the second line data,
   wherein the multiplexing control circuit is configured to receive a first synchronization signal corresponding the first image data and a second synchronization signal corresponding to the second image data, and the first synchronization signal and the second synchronization signal being different from each other,
   wherein a processing order of the first line data and the second line data is determined based on a phase of the first synchronization signal and a phase of the second synchronization signal, and
   wherein the multiplexing control circuit is not configured to transmit data in the TDM mode in units of frame data, but is configured to transmit data in the TDM mode in the units of line data without using an external memory.

2. The image signal processor of claim 1, wherein the first image data is data captured by a first imaging device having a first resolution and the second image data is data captured by a second imaging device having a second resolution.

3. The image signal processor of claim 1, further comprising:
   a first buffer; and
   a second buffer,
   wherein the first data processing circuit comprises a memory controller configured to store the first line data and the second line data in the first buffer and the second buffer, respectively.

4. The image signal processor of claim 1, wherein
   the first data processing circuit configures elements to process the first line data if the switching control signal indicates that the current line data is the first line data, and
   the first data processing circuit configures the elements to process the second line data if the switching control signal indicates that the current line data is the second line data.

5. The image signal processor of claim 1, wherein the first data processing circuit is a first image signal processor core and the second data processing circuit is a second image signal processor core.

6. The image signal processor of claim 1, wherein the first data processing circuit is a first scaler and the second data processing circuit is a second scaler.

7. The image signal processor of claim 1, wherein the multiplexing control circuit is further configured to first transmit one of the first line data and the second line data to the first data processing circuit based on a phase of a first sync signal related to the first image data and a phase of a second sync signal related to the second image data.

8. The image signal processor of claim 7, wherein the multiplexing control circuit comprises a line memory configured to store the other one of the first line data and the second line data.

9. The image signal processor of claim 1, wherein the multiplexing control circuit is further configured to transmit the first line data and the second line data in a single stream to the first data processing circuit.

10. The image signal processor of claim 1, wherein the multiplexing control circuit is further configured to generate a line data sync signals based on both a received first data sync signal and a received second data sync signal, the received first data sync signal associated with the first image data, the received second data sync signal associated with the second image data.

11. An application processor comprising:
    a bus;
    an image signal processor connected to the bus, the image signal processor including, a first data processing circuit configured to process first image data and/or second image data in a first operating mode, and a second data processing circuit configured to process the first image data and/or the second image data in a second operating mode, in units of line data in a time-division-multiplexing (TDM) mode on the fly, the first image data and the second image data being data output from respective ones of imaging devices, the first operating mode being different from the second operating mode, a multiplexing control circuit configured to transmit,
  first line data included in the first image data and second line data included in the second image data to the first data processing circuit in the TDM mode in a line by line manner in the first operating mode, the first image data and the second image data having a first resolution and a second resolution, respectively, and
  a switching control signal to the first data processing circuit to cause the first data processing circuit to configure elements therein to process current line data, the switching control signal being a signal indicating whether the current line data to be transmitted to the first data processing circuit is the first line data or the second line data; and a central processing unit (CPU) connected to the bus and configured to control the image signal processor,
wherein the multiplexing control circuit is configured to receive a first synchronization signal corresponding to the first image data and a second synchronization signal corresponding to the second image data, and the first synchronization signal and the second synchronization signal being different from each other,
wherein a processing order of the first line data and the second line data is determined based on a phase of the first synchronization signal and a phase of the second synchronization signal, and
wherein the multiplexing control circuit is not configured to transmit data in the TDM mode in units of frame data, but is configured to transmit data in the TDM mode in the units of line data without using an external memory.

12. The application processor of claim 11, wherein the multiplexing control circuit is further configured to transmit the first line data and the second line data in a single stream to the first data processing circuit.

13. The application processor of claim 11, wherein the image signal processor further comprises a first buffer and a second buffer, wherein the first data processing circuit comprises a memory controller configured to store the first line data and the second line data in the first buffer and the second buffer, respectively.

14. The application processor of claim 11, wherein the first data processing circuit configures elements to process the first line data if the switching control signal indicates that the current line data is the first line data, and configures the elements to process the second line data if the switching control signal indicates that the current line data is the second line data.

15. The application processor of claim 11, wherein the multiplexing control circuit is further configured to first transmit one of the first line data and the second line data to the first data processing circuit based on a phase of a first sync signal related to the first image data and a phase of a second sync signal related to the second image data.

16. The application processor of claim 15, wherein the multiplexing control circuit comprises a line memory configured to store one of the first line data and the second line data not to be transmitted.

* * * * *